United States Patent
Khoryaev et al.

(10) Patent No.: US 10,756,869 B2
(45) Date of Patent: Aug. 25, 2020

(54) DEMODULATION IN WIRELESS COMMUNICATIONS

(71) Applicant: Apple Inc., Cupertino, CA (US)

(72) Inventors: Alexey Khoryaev, Nizhny Novgorod (RU); Andrey Chervyakov, Nizhny Novgorod (RU); Dmitry Belov, Nizhny Novgorod (RU); Mikhail Shilov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 121 days.

(21) Appl. No.: 15/744,009

(22) PCT Filed: Dec. 24, 2015

(86) PCT No.: PCT/US2015/000346
§ 371 (c)(1),
(2) Date: Jan. 11, 2018

(87) PCT Pub. No.: WO2017/026975
PCT Pub. Date: Feb. 16, 2017

(65) Prior Publication Data
US 2018/0212733 A1    Jul. 26, 2018

Related U.S. Application Data

(60) Provisional application No. 62/204,215, filed on Aug. 12, 2015.

(51) Int. Cl.
*H04L 5/00* (2006.01)
*H04W 76/14* (2018.01)
(Continued)

(52) U.S. Cl.
CPC .......... *H04L 5/0051* (2013.01); *H04L 5/0023* (2013.01); *H04W 56/0035* (2013.01);
(Continued)

(58) Field of Classification Search
CPC ..................................................... H04L 5/0051
See application file for complete search history.

(56) References Cited

U.S. PATENT DOCUMENTS

2014/0321360 A1* 10/2014 Han ................. H04W 72/1278
                                                                370/328
2015/0043398 A1*  2/2015 Fwu ..................... H04W 76/10
                                                                370/330
(Continued)

FOREIGN PATENT DOCUMENTS

WO        20140137105 A1      9/2014

OTHER PUBLICATIONS

International Search Report and Written Opinion for International Patent Application No. PCT/US2015/000346 dated Apr. 12, 2016; 14 pages.

(Continued)

*Primary Examiner* — Andrew Lai
*Assistant Examiner* — Andrew C Lee
(74) *Attorney, Agent, or Firm* — Fish & Richardson P.C.

(57) ABSTRACT

A wireless communication device is configured to perform demodulation of device-to-device (D2D) communication signals or LTE uplink signals in a User Equipment. In a transmitter, demodulation reference signal (DMRS) generation circuitry is provided for selective insertion of DMRS signals in resource elements of resource blocks of the signal for transmission using a pattern of resource elements spanning at least one of the resource blocks such that a minimum temporal spacing between consecutive symbols of the demodulation reference signal pattern is less than one slot.

(Continued)

In a receiver the DMRS signals are used to perform channel estimation. A user equipment having the DMRS generation circuitry is provided. A computer program product is also provided. Other embodiments may be described and claimed.

16 Claims, 23 Drawing Sheets

(51) Int. Cl.
  *H04W 56/00* (2009.01)
  *H04W 72/04* (2009.01)
  *H04W 4/46* (2018.01)

(52) U.S. Cl.
  CPC ......... *H04W 72/042* (2013.01); *H04W 76/14* (2018.02); *H04W 4/46* (2018.02)

(56) References Cited

U.S. PATENT DOCUMENTS

| | | | |
|---|---|---|---|
| 2016/0037491 A1 | 2/2016 | Hwang et al. | |
| 2016/0135239 A1* | 5/2016 | Khoryaev | H04W 76/14 370/329 |
| 2016/0353478 A1* | 12/2016 | Kim | H04W 72/12 |
| 2016/0381690 A1* | 12/2016 | Kim | H04L 5/0037 370/329 |
| 2017/0013628 A1* | 1/2017 | Kim | H04J 11/0026 |
| 2017/0019905 A1* | 1/2017 | Ko | H04B 17/364 |
| 2017/0019937 A1* | 1/2017 | Kim | H04L 67/303 |
| 2017/0027013 A1* | 1/2017 | Kim | H04W 72/04 |
| 2017/0041971 A1* | 2/2017 | Kim | H04W 76/14 |
| 2017/0078863 A1* | 3/2017 | Kim | H04W 48/16 |
| 2017/0181206 A1* | 6/2017 | Lee | H04W 76/14 |

OTHER PUBLICATIONS

3GPP TR 36.877 V12.0.0 (Mar. 2015); "Technical Specification Group Radio Access Network; LTE Device to Device (D2D) Proximity Services (ProSe); User Equipment (UE) radio transmission and reception (Release 12)," 40 pages.

LG Electronics, et al.; "New SI proposal: Feasibility Study on LTE-based V2X Services," Agenda Item: 13.1.1; 3GPP TSG RAN Meeting #68 RP-151109; Malmö, Sweden, Jun. 15-18, 2015; 7 pages.

Huawei, Hisilicon; "Final details of D2D synchronization signals," Agenda Item: 6.2.1.1.1; 3GPP TSG RAN WG1 Meeting #79 R1-144566; San Francisco, USA, Nov. 17-21, 2014; 13 pages.

PCT International Preliminary Report on Patentability in International Appln. PCT/US2015/000346, dated Feb. 22, 2018, 9 pages.

3GPP TS 23.303 V13.0.0 (Jun. 2015); "Technical Specification Group Services and System Aspects; Proximity-based services (ProSe); Stage 2 (Release 13)," 97 pages.

3GPP TS 36.101 V13.0.0 (Jul. 2015); "Technical Specification Group Radio Access Network; Evolved Universal Terrestrial Radio Access (E-UTRA); User Equipment (UE) radio transmission and reception (Release 13)," 699 pages.

3GPP TS 36.104 V13.0.0 (Jul. 2015); "Technical Specification Group Radio Access Network; Evolved Universal Terrestrial Radio Access (E-UTRA); Base Station (BS) radio transmission and reception (Release 13)," 156 pages.

3GPP TS 36.201 V12.2.0 (Mar. 2015); "Technical Specification Group Radio Access Network; Evolved Universal Terrestrial Radio Access (E-UTRA); LTE physical layer; General description (Release 12)," 14 pages.

3GPP TS 36.211 V12.6.0 (Jun. 2015); "Technical Specification Group Radio Access Network; Evolved Universal Terrestrial Radio Access (E-UTRA); Physical channels and modulation (Release 12)," 136 pages.

* cited by examiner

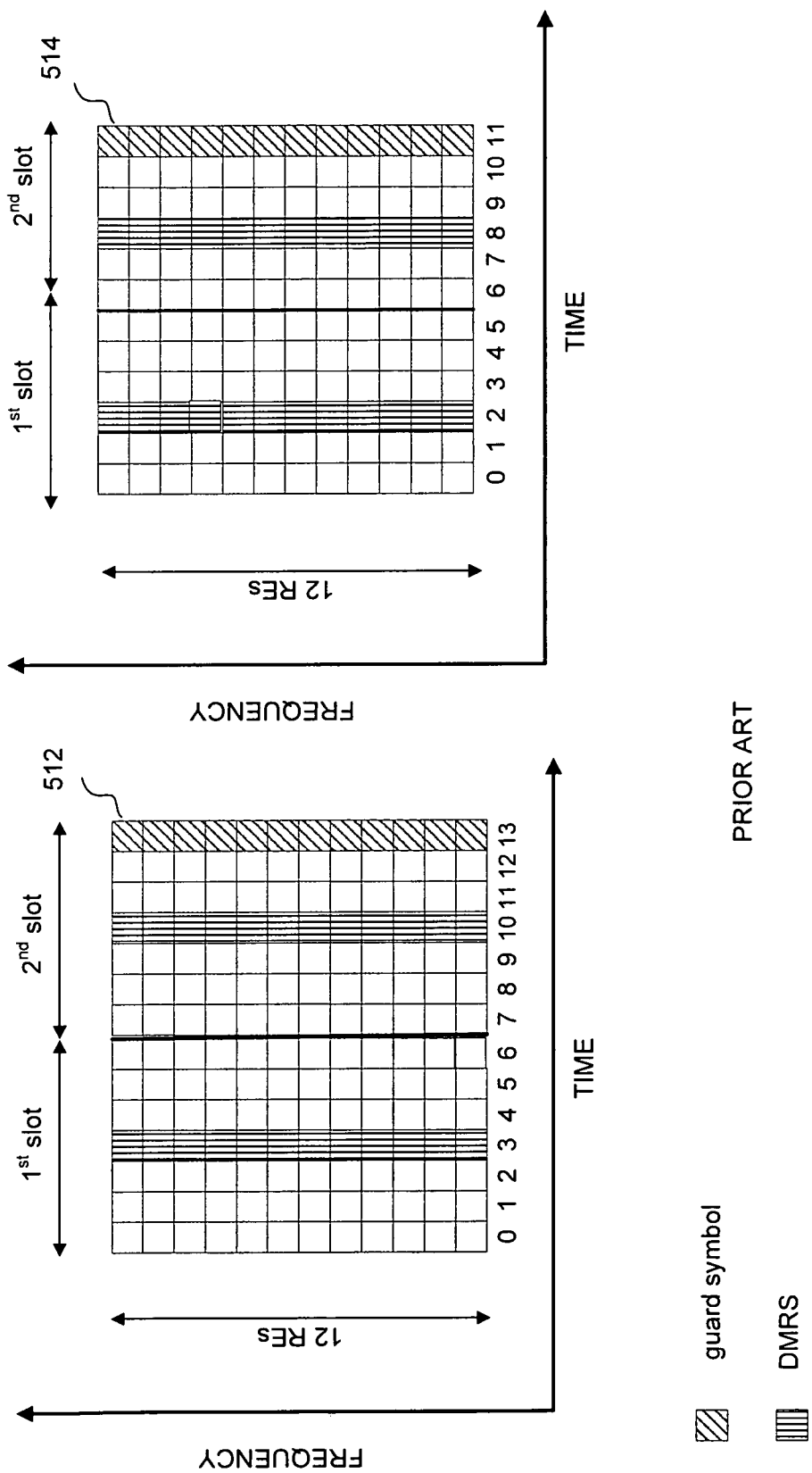

▨ guard symbol

▥ DMRS

▨ guard symbol

▥ DMRS

▨ guard symbol

▦ DMRS

▨ DMRS

DEMODULATION IN WIRELESS COMMUNICATIONS

CROSS REFERENCE TO RELATED APPLICATIONS

The present application is a national phase entry under 35 U.S.C. § 371 of International Application No. PCT/US2015/000346, filed Dec. 24, 2015, entitled "DEMODULATION IN WIRELESS COMMUNICATIONS", which claims priority to U.S. Provisional Patent Application No. 62/204,215, filed Aug. 12, 2015, entitled "ENHANCED SIGNAL TRANSMISSION METHOD FOR LTE V2V OPERATION", the entire disclosures of which are hereby incorporated by reference in their entireties.

TECHNICAL FIELD

Embodiments described herein generally relate to the field of communications, and more particularly, to Long Term Evolution, LTE and LTE-Advanced (LTE-A) uplink communications and device-to-device (D2D) communication, or equivalently, Proximity Services (ProSe) communication in wireless communication networks.

BACKGROUND

The automotive industry is currently researching and developing automated vehicles including road safety and driverless vehicles applications and with this comes a motivation to connect more vehicles with each other and with the Internet. There is a perceived need for a vehicle-to-vehicle (V2V) communication system capable of establishing communication links between vehicles allowing very rapid and very reliable communication, beyond what 4G wireless network technologies can currently provide.

The third generation partnership project (3GPP) LTE and LTE-A wireless telecommunication technologies, which typically involve transmission rights being granted by a scheduler in an evolved NodeB (eNodeB), have certain limitations meaning that they are not entirely suitable for V2V communication. For example, latency rises with the number of users in a cell and every data packet, such as a data packet between two nearby vehicles, is typically directed through the eNodeB, which introduces an uplink (UL) and a downlink (DL) communication can introduce delay, particularly in an overloaded cell. A single radio transmission along a direct path between source and transmission nodes is likely to be more efficient. D2D communication enables User Equipments (UEs) to discover and communicate with each other directly and allows communication delay to be reduced whist still allowing the infrastructure to retaining control of control plane functions such as radio resource allocation. A ProSe feature specified by 3GPP Technical Specification (TS) 23.303, July 2015 allows for ProSe Direct Discovery and ProSe Direct Communication, which enable UEs to discover and communicate with each other directly. In this specification D2D and ProSe can be used interchangeably. A direct radio link between two or more UEs is known as a "sidelink" (see 3GPP Technical specification (TS) 36.211), to distinguish it from conventional uplink and downlink connections between UE and eNodeB. Sidelink (SL) communications use a subset of the LTE UL time-frequency resources and use Single Carrier-Frequency Division Multiple Access (SC-FDMA), i.e., the similar transmission schemes as LTE uplink transmissions. The relevant SL channels are: PSCCH for SL control information; PSSCH for SL data; PSDCH for discovery announcements and PSBCH for broadcast of system information. Further in this description the PSXCH term is used to denote any of the SL physical channel. Any references in this specification to LTE can be interpreted to include LTE and/or LTE-A.

There is a motivation to enhance the ProSe interface to meet the desirable features of V2V services over licensed and unlicensed spectrum, particularly to cope with vehicle speeds and carrier frequencies (e.g. up to 280 km/h; and up to 6 GHz) where transmission may potentially be less reliable due Doppler effects. There is also a motivation to enhance LTE UL for the same reasons. There are two general propagation effects that arise from motion of one or more of a transmitting and receiving UE. Firstly, there is a Doppler frequency shift for line-of-sight paths for transmitter and receiver. Secondly, there is Doppler spread for non-line-of-sight paths.

LTE/LTE-A may be one of the main candidate technologies to realize the "connected cars" concept and provide the vehicles with wireless connection among each other and to the Internet. To address the strong interest of the vehicle manufacturers and cellular network operators in the 'connected cars' concept, the LTE Release 13 study on LTE-based V2X Services has been recently discussed, for example as found in: RP-151109, "New SI proposal: Feasibility Study on LTE-based V2X Services", LG Electronics, CATT, Vodafone, Huawei, 3GPP RAN Meeting #68, June 2015. The study objective may be to evaluate new functionalities and potential enhancements to operate LTE-based V2X services, for example vehicle-to-vehicle (V2V), vehicle-to-infrastructure/network (V2I/N), and vehicle-to-pedestrian (V2P).

The V2V services may be deployed in the 6 GHz band, although other bands are not precluded. Furthermore, in accordance to the legacy criteria the V2V operation may be supported for the high speed scenarios, for example up to 280 km/h relative vehicles speed. Therefore, in embodiments, LTE physical layer channels for V2V may be robust enough and may provide reliable performance in the high Doppler scenarios (i.e. up to 1.5 kHz Doppler frequency).

Enhanced PC5 transport channels (i.e. SL device-to-device (D2D) physical channels) may be considered to be used to enable direct V2V operation. At the same time, the "legacy" (i.e. previously known) LTE SL physical channels may be designed with the assumption of substantially lower maximum Doppler frequency. Therefore, it may be advantageous for certain enhancements to the SL physical layer design to be introduced to efficiently support V2V services. It will be appreciated by the skilled person that embodiments apply not only to LTE SL physical channels but also to LTE UL physical channels (non-SL) and demodulation of UL physical channels. In general, demodulation according to embodiments applies to LTE wireless communications originating from a UE, which includes SL communications and UL communications.

BRIEF DESCRIPTION OF THE DRAWINGS

Embodiments described herein are illustrated by way of example, and not by way of limitation, in the figures of the accompanying drawings in which like reference numerals refer to similar elements:

FIG. 5A schematically illustrates a legacy demodulation reference signal pattern within an LTE/LTE-A subframe for Normal Cyclic prefix;

FIG. 5B schematically illustrates a legacy demodulation reference signal pattern within an LTE/LTE-A subframe for Extended Cyclic prefix;

DESCRIPTION OF EMBODIMENTS

Figure 1A:
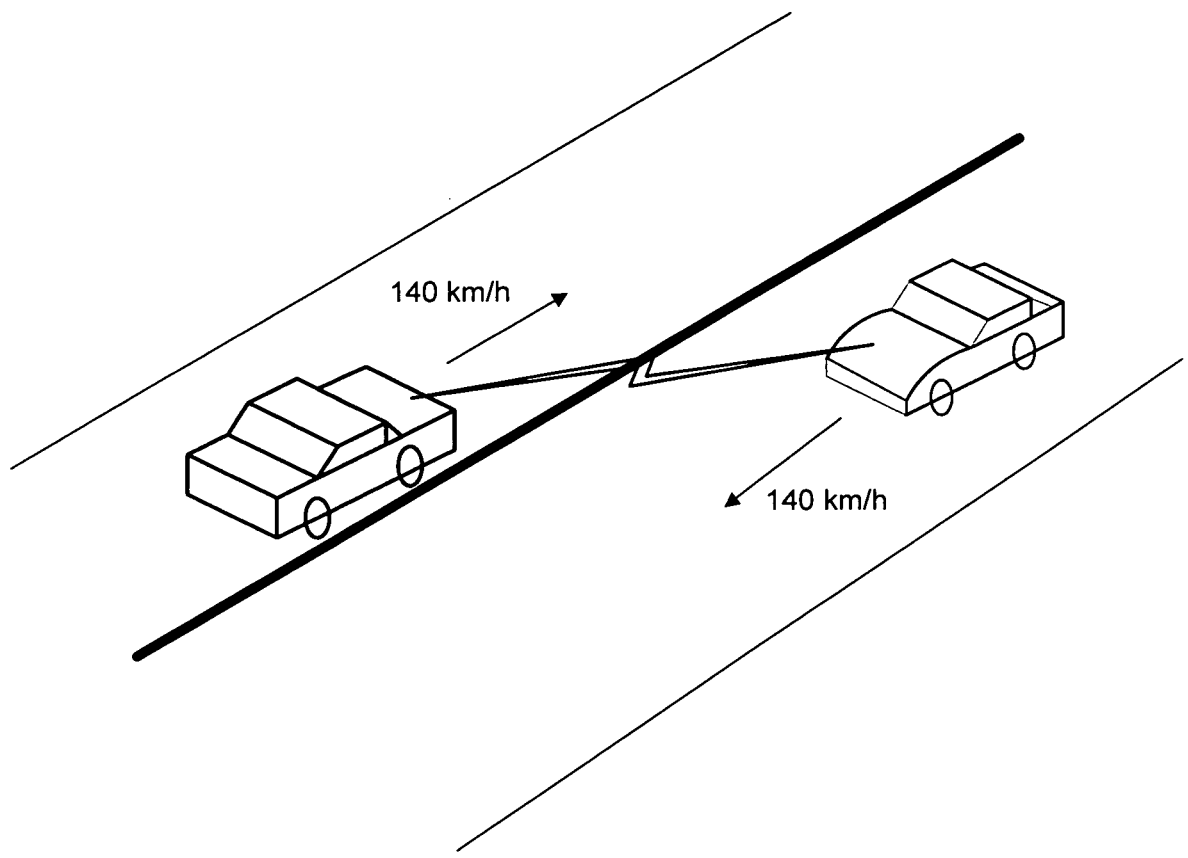
FIG. 1A schematically illustrates a vehicle-to-vehicle wireless cellular communication in which two communicating vehicles are travelling towards each other at a high relative speed.

Illustrative embodiments of the present disclosure include, but are not limited to, methods, systems, apparatuses and computer programs for performing wireless device-to-device communication.

Embodiments of this disclosure include SL and UL demodulation reference signal (DMRS) enhancements that may support reliable operation in the high Doppler scenarios. In this disclosure, embodiments may include a number of SL DMRS enhancements and non-SL UL enhancements to support reliable V2V operation in high Doppler scenarios (e.g. up to 1500 Hz). In embodiments, several new DMRS signal patterns to facilitate better channel estimation are disclosed, DMRS signal patterns according to embodiments increase the DMRS density in the time domain to enable more accurate channel estimation under high Doppler fading conditions. It will be appreciated by the skilled person that DMRS signal patterns of the embodiments can apply to LTE SL or can apply to LTE UL wireless communications.

The DMRS enhancements (i.e. patterns applied periodically such as every subframe or every slot) according to the present technique can be used to more efficiently handle at least one of: (i) Doppler frequency shift for line-of-sight conditions; or (ii) Doppler spread for line-of-sight conditions. In this specification, the phrase "at least one of A, B or C", can be interpreted to include within its scope, variants in which only A is present, only B is present, only C is present or two or more selected from the set A, B, C are present, e.g. A and C only (not B). In other words, at least one item can be selected from the list of items, but different combinations of two items or all three items can be present. Similarly for other lists of two or more items.

Doppler frequency shift is similar to receive signal carrier frequency offset and results in a phase offset between different OFDM/SC-FDMA symbols in the received signal. The offset can to be compensated for prior to demodulation processing. DMRS signals can be used to make an estimate of the phase offset, which is then used to compensate it on the data OFDM/SC-FDMA symbols for a given SL or UL channel. The lower the temporal spacing between the consecutive DMRS symbols in the physical resource block, the larger the frequency offset that can be estimated. Embodiments enable handling of larger carrier frequency offsets by more densely packing DMRS signals in the time domain in radio frames.

Doppler fading/spread, which is typically handled during channel estimation processing. Using smaller spacing between the DMRS symbols in the time domain according to the embodiments described below provides better channel interpolation accuracy. The maximum carrier frequency offset which can be estimated at the UE side is inversely proportional to the DMRS spacing in time domain. So, smaller temporal spacing of the DMRS signals corresponds to the ability of the receiver to handle higher carrier frequency offsets in order to accurately reproduce a transmitted signal as an output of the received path.

In summary, using reduced DMRS spacing according to the present technique in LTE SL or UL transmissions allows: 1) handling of larger receiver signal carrier frequency errors, e.g. due to Doppler shift or frequency synchronization errors which can be larger for high mobility and high carrier frequencies; and 2) handling of larger Doppler spreads, which can be more severe for high mobility and high carrier frequency V2V conditions.

The DMRS signal patterns according to the present technique can be either contiguous or non-contiguous in frequency, considering a DMRS pattern applied to a given transmission. Contiguous DMRS patterns can be efficient to implement because characteristically they tend to have a lower peak-to-average power ratio than a non-contiguous DMRS pattern.

In LTE, DMRS are used for channel estimation and synchronization during demodulation in the receiver path and are generated from a block of base sequences which are multiples of twelve, corresponding to the number of carriers in a resource block. The DMRS are transmitted within the set of physical resource blocks to be demodulated.

A transmitted signal may be corrupted due to time dispersion on a radio channel, which occurs due to the signal propagating to the receiver via multiple paths with different delays. In the frequency domain a time dispersive channel gives a non-constant channel frequency response i.e. leads to frequency selectivity, which can lead to higher error rates for given signal-to-noise/interference ratios. For a UE that is moving rapidly, the detailed structure of the channel frequency response is likely to vary rapidly with time and the rate of variations in the channel frequency response is related to the "Doppler spread" of the channel, which is defined as $f_D=(v/c)*f_c$, where v is the speed of the terminal, c is the speed of light and $f_c$ is the carrier frequency. Doppler spread can lead to complex frequency shifting effects which depend on the carrier frequency. FIG. 1A schematically illustrates a V2V wireless cellular communication scenario where two vehicles, each travelling towards each other on opposite sides of the road at respective speeds of around 140 km/h giving a relative speed of 280 km/h.

DMRS are used to perform channel estimation of resource elements of the physical resource block corresponding to the SL channel (e.g. PSCCH, PSSCH) and this channel estimation involves filtering in time and in frequency. The filter parameters depend on the average Doppler spread. Inserting DMRS in subframes or slots at a spacing of less than one slot provides for better interpolation accuracy in the channel estimation filters.

Figure 1B:
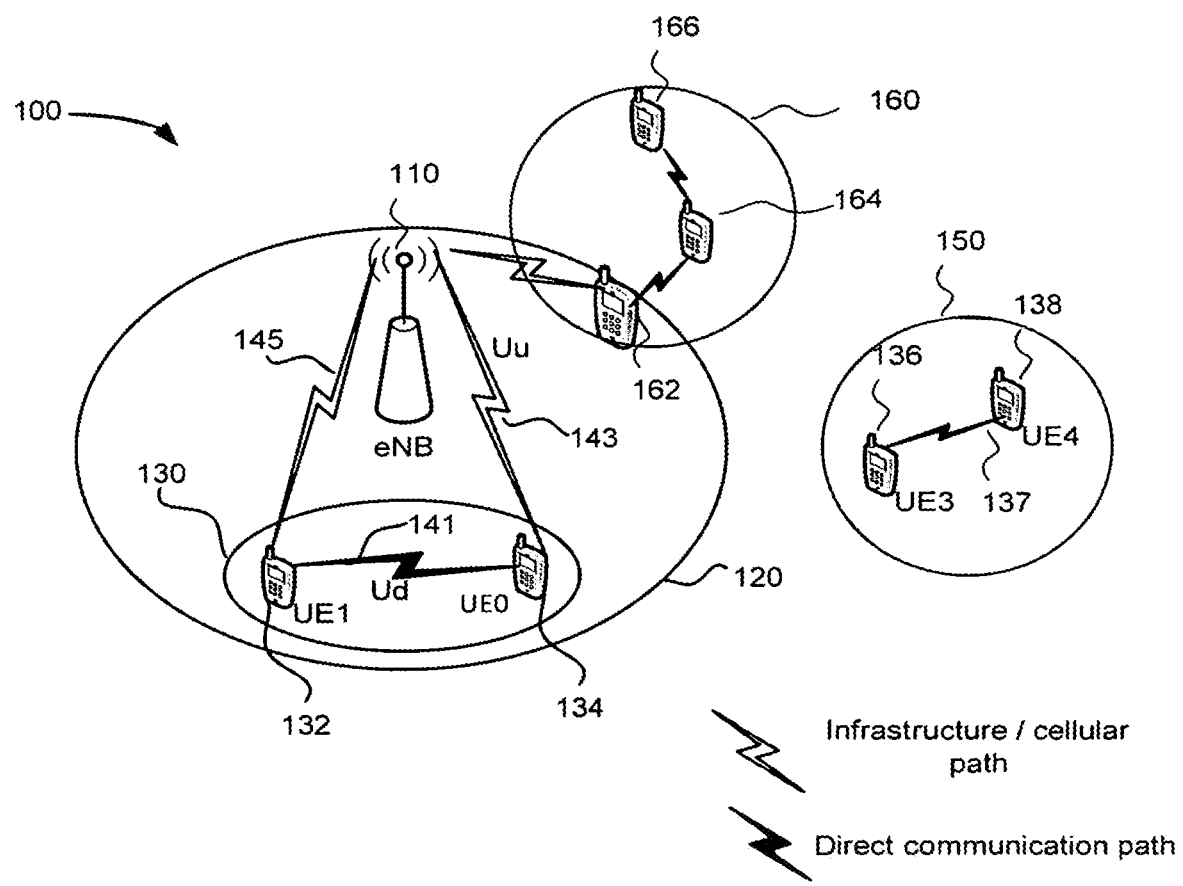
FIG. 1B schematically illustrates a wireless communication network implementing device-to-device communication both in and out of cellular wireless network coverage.

Carrier frequency offset can occur due to a mismatch in frequencies used by the transmitter and receiver. Closer spacing on the time axis of the DMRS can result in a reduction in carrier frequency offset so that the channel can be tracked more precisely. FIG. 1B schematically illustrates a wireless communication network 100 implementing D2D or peer-to-peer communication both in and out of cellular wireless network coverage from a cellular network such as an LTE or LTE-A network. The network 100 comprises a node 110 and UEs 132, 134, 136, 138. In a 3GPP radio access network (RAN) LTE and LTE-A systems, the node 110 can be an Evolved Universal Terrestrial Radio Access Network (E-UTRAN) Node B (also commonly denoted as an evolved Node B, enhanced Node B, eNodeB, or eNB) or a combination of a node and one or more Radio Network Controllers (RNCs). The eNodeB 110 communicates with one or more wireless device, known as a user equipment (UE). Examples of a UE include a mobile terminal, a tablet computer, a personal digital assistant (PDA) and a machine-type communication (MTC) device. The downlink (DL) transmission can be a communication from the node (or eNodeB) to the wireless device (or UE), and the uplink (UL) transmission can be a communication from the wireless device to the node.

One example of a SL communication is the communication 137 between the UE 136 and the UE 138 in FIG. 1B. SL communications enable proximity service, direct discovery and direct communication and are described, for example, in 3GPP TS 36.201, April 2015. SL transmissions typically occur within a subset of LTE/LTE-A uplink time frequency resources and use Single Carrier Frequency Division Multiple Access, SC-FDMA, similarly to the LTE/LTE-A uplink channels (e.g. Physical Uplink Control Channel, PUCCH, and Physical Uplink Shared Channel, PUSCH). A number of special SL channels are defined (see e.g. 3GPP TS 36.211, July 2015): Physical Sidelink Control Channel (PSCCH) for control information; Physical Sidelink Shared Channel (PSSCH) for sidelink data; and Physical Sidelink Discovery Channel (PSDCH) for discovery announcements. The SL physical channels (and corresponding transport channel) were introduced as part of a ProSe set of features in Release 12 of the LTE standards.

A first D2D cluster 130 comprises a first UE 132 and a second UE 134, which are each within network coverage because they are both located in a cell 120 associated with the eNodeB 110. A cluster may include more than two UEs. A direct communication path 141 exists between the first UE 132 and the second UE 134, allowing data to pass between a transmitting UE and a receiving UE without being routed via the eNodeB 110. However, in this embodiment, control of the D2D data path, PC5, 141 is performed via the eNodeB 110 using cellular communication paths 143 and 145. Thus data passes directly between the transmitting and receiving UEs 132, 134 whereas control of the D2D link is performed via the eNodeB 110. This is referred to as "mode 1" SL communication. The eNodeB 110 performs setup control, radio bearer control and resource control of the D2D data path 141. The eNodeB 110 assigns resources for D2D communication in PSCCH and PSSCH.

The D2D cluster 130 corresponds to an in-coverage D2D communication scenario, where at least one of the UE 132 or the UE 134 has connectivity to the wireless cellular infrastructure via the eNodeB 110 for control of the D2D communications. For the in-coverage D2D cluster 130, cellular spectrum (e.g. LTE or LTE-A spectrum) can be used for both the D2D path 141 and the cellular links 143, 145. In some embodiments, communication may be configured in "underlay" mode, where D2D links and cellular links dynamically share the same radio resources and in other embodiments in "overlay" mode may be used, where D2D communication links are allocated dedicated cellular wireless resources including the option when a dedicated D2D carrier is allocated for D2D communication. In overlay mode, "resource pools" of the LTE/LTE-A uplink spectrum are allocated for use in D2D communications. For example, physical resource blocks can be periodically allocated to the PSCCH and/or physical resource blocks can be periodically allocated to the PSSCH.

A second D2D cluster 150 comprising a third UE 136 and a fourth UE 138 corresponds to an out-of-coverage D2D cluster performing "mode-2" or "autonomous" SL transmission, in which neither of the UEs 136, 138 is able to form a connection with an eNodeB of the wireless cellular infrastructure. In this out-of-coverage D2D communication cluster 150, the UEs themselves can be configured to perform peer discovery and communication without network support. Note that "mode 2" D2D transmission can be performed by UEs that are in-coverage as well as those which are out of coverage. For mode 2, the UE selects transmission resource from predefined resource pools for both PSCCH and PSSCH whereas in mode 1 an eNodeB assigns transmission resources.

A third D2D cluster 160 in FIG. 1B comprises a UE 162, which is in direct communication with the eNodeB 110 and two further UEs 164, 166 that do not have a direct cellular communication link to the eNodeB 110.

In the first D2D cluster 120, which is in-coverage, the two UEs 132, 134 of the cluster pair may have radio resources for their respective D2D transmissions allocated by the eNodeB 110 and they may also achieve frequency synchronization as well as sub-frame, slot and symbol synchronization in the time domain via the eNodeB. Similarly, the third D2D cluster 160 may achieve timing and frequency synchronization via the UE 162. However, the out-of coverage UEs 136, 138 of the second cluster 150 will have to achieve frequency and timing synchronization in some other way and they will also have to manage D2D transmission scheduling and contention for physical resources.

Figure 2:
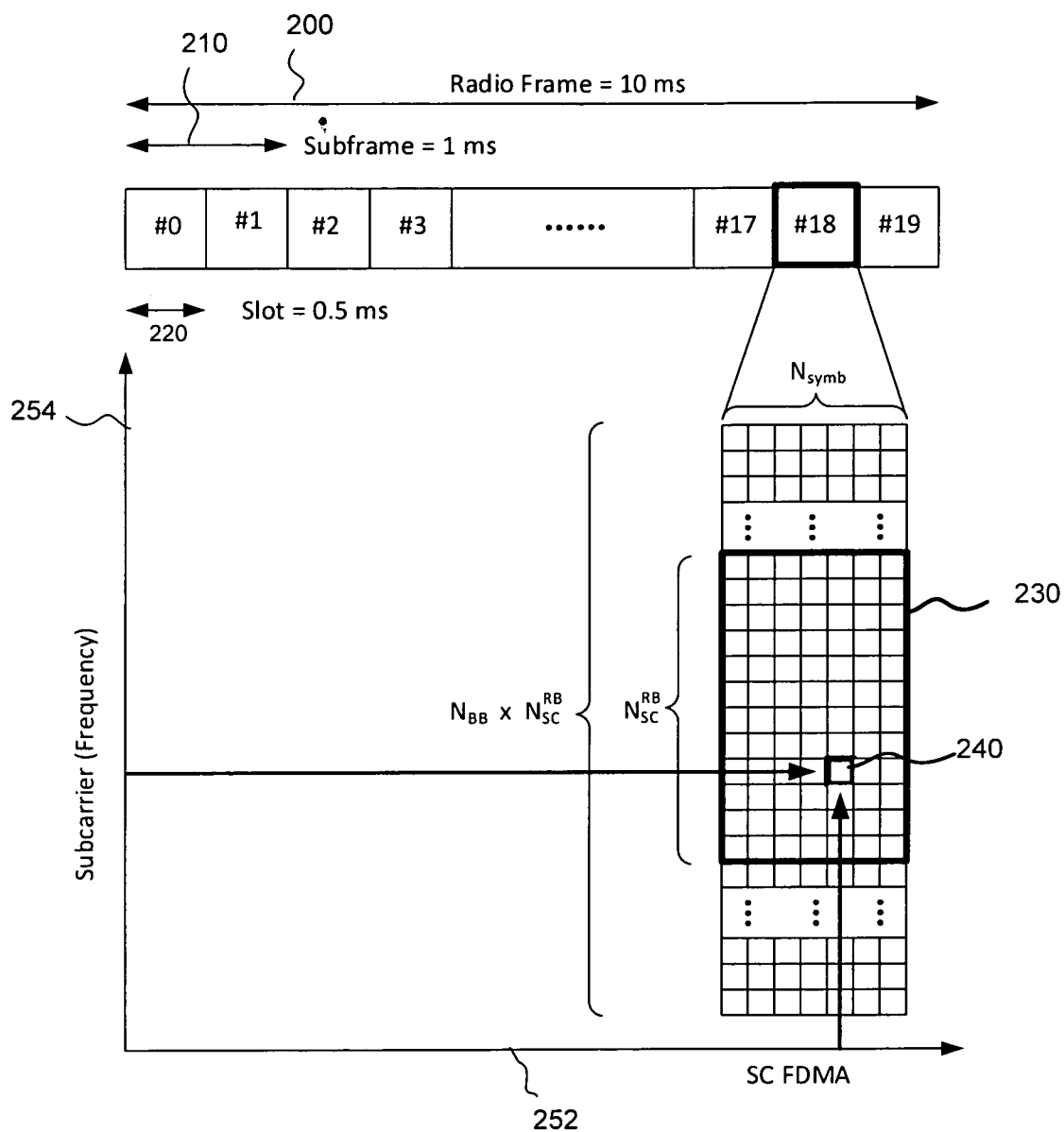
FIG. 2 schematically illustrates a block diagram of radio frame resources corresponding to an uplink LTE radio frame structure and also to a device-to-device "sidelink" radio frame structure.

FIG. 2 schematically illustrates a block diagram of radio frame resources corresponding to an uplink LTE radio frame structure, which is the same as a D2D "SL" radio frame structure. A radio frame 200 has a duration of 10 milliseconds and is composed of twenty contiguous 0.5 millisecond slots. A subframe 210 is formed from two adjacent slots and thus has a one millisecond duration. FIG. 2 shows slot #18, which is the penultimate slot of the frame, in more detail. A single resource block 230 can be seen to comprise a number of SC-FDMA symbols $N_{symbol}=7$ on a time axis 252 and a plurality of subcarriers $N_{SC}^{RB}=12$ on a frequency axis 254. A different type of frame having an extended cyclic prefix (CP) has $N_{symbol}=6$, but has the same number of subcarriers on the frequency axis as the normal CP resource block. The physical resource block 230 comprises a total of $N_{symbol} \times N_{SC}^{RB}$ constituent resource elements.

A single resource element 240 is characterized by a single subcarrier frequency and a single SC-FDMA symbol. In FIG. 2, although only one complete resource block 230 is shown, a plurality of resource blocks $N_{BB}$ are associated with each of the twenty slots of the radio frame 200. The resource block 230 in the FIG. 2 example is mapped to eighty-four resource elements 240 using short or normal cyclic prefixing and is mapped to seventy-two resource elements using extended cyclic prefixing.

Each resource element 240 can be used to transmit a number of bits depending upon the particular type of modulation scheme employed for the channel with which the resource element is associated. For example, where the modulation scheme is quadrature phase-shift keying (QPSK), each resource element 240 can be used to transmit two bits. For a 16 quadrature amplitude modulation (QAM) or 64 QAM more bits can be transmitted per resource element. However, for binary phase shift keying (BPSK), a single bit can be transmitted in each resource element. The resource block 230 for downlink transmission from the eNodeB to the UE is identical to the one shown in FIG. 2, but used OFDMA is used for DL instead of SC-FDMA.

Figure 3:
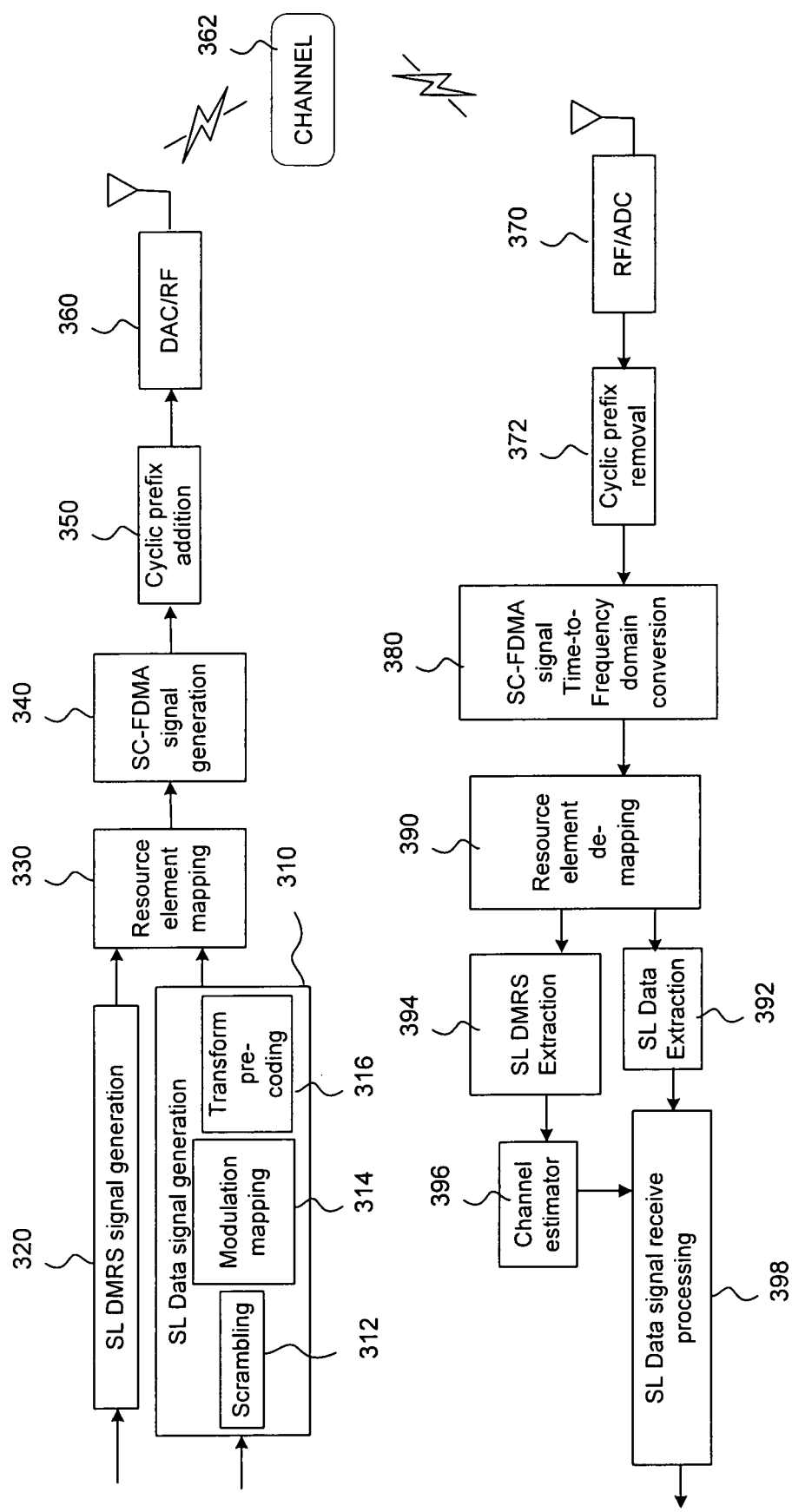
FIG. 3 schematically illustrates a sidelink or uplink transmission and reception chain including insertion and recovery of demodulation reference signals.

FIG. 3 schematically illustrates a SL transmission and reception chain including insertion and recovery of DMRS. The transmitter path comprises: an SL data signal generation unit 310 having scrambling logic 312, modulation mapping logic 314 and transform precoding logic 316; an SL DMRS signal generation unit 320; a resource element mapping unit 330; an SC-FDMA signal generation unit 340; a cyclic prefix addition unit 350; and a Digital-to-Analogue converter (DAC)/radio frequency RF unit 360. The logic in the scrambling, modulation mapping and SC-FDMA transform precoding components 312, 314, 316 of the SL data signal generation unit 310 can comprise at least one of hardware, firmware or software and, if implemented in software, the respective logic uses processing circuitry to execute the associated function.

The receiver path comprises: an RF/Digital-to-analogue (DAC) converter 370; a cyclic prefix removal unit 372; an SC-FDMA signal time to frequency conversion unit 380; a resource element de-mapping unit 390; an SL data extraction unit 392; and SL DMRS extraction unit 394; a channel estimator 396; and SL data receive processing circuitry 398.

In the transmitter path, the scrambling logic 312 applies a number of different scrambling codes to the input data signal and the transmitter selects for transmission the SC-FDMA modulated signal having better power efficiency characteristics. This can reduce power consumption and improve efficiency in the transmitter. In the receiver, decoding is carried out for all possible scrambling sequences, although the correct decoding result will be obtained only for the scrambling code actually used for transmission. The modulation mapping logic 314 uses a baseband modulator to transform binary input data into a multilevel sequence of complex numbers in one of a number of different modulation schemes: binary phase shift keying (BPSK), quaternary PSK (QPSK), 16 level quadrature amplitude modulation (16-QAM) and 64-QAM. The modulation format and hence the transmission bit rate is adapted to match current channel conditions of the UE. The SC-FDMA transform precoding unit 316 applies Discrete Fourier Transform (DFT) precoding to the input data. Note that this SC-FDMA transform precoding is not applied to the DMRS signal by the SL-DMRS signal generation unit 320. Similarly, in conventional PUSCH and PUCCH, DFT precoding is not applied for DMRS transmission.

There are two different inputs to the resource element mapping unit 330: firstly, scrambled, modulated and transform pre-coded input date for the SL channel (e.g. PSSCH); and SL-DMRS signal data. The DMRS signals are processed via OFDM (i.e. they have an LTE SC-FDMA waveform without DFT precoding). Thus whilst the PSSCH data or other SL channel data is processed by an M-point DFT in the transmitter (not shown) and an M-point IDFT in the receiver (not shown), the DMRS signals are not. The use of OFDM (i.e. no DFT precoding) for the DMRS signals whereas SC-FDMA is used for the PSXCH data is that it helps to keep a substantially constant modulus signal in the frequency domain to facilitate channel estimation. OFDM is used both for UL and SL DMRS transmissions. Furthermore DMRS signals are designed to have a low peak-to-average power ratio relative to the data transmissions, so use of SC-FDMA is less important for DMRS transmission than for the data transmissions. Note that the present technique can be applied to LTE UL communications so that in FIG. 3, the DMRS signal is an UL DMRS signal this is input to the resource element mapping unit along with UL channel data.

As part of the resource element mapping process implemented by the resource element mapping unit 330, DMRS signals generated and output by the SL DMRS signal generation unit 320 are inserted into resource elements of the physical resource blocks according to a selected pattern. The pattern can be selected according to one or more selection criteria selected from, for example, a transmitter speed, a relative speed of a transmitter and a target receiver and a frequency band.

For example, a denser placement of DMRS signals within a slot and/or subframe can be selected for a higher carrier frequency and a less-dense placement can be selected for a lower carrier frequency. The DMRS patterns can comprise resource elements of a physical resource block that are contiguous in the frequency domain and can occupy only a subset of symbols of a slot. Alternatively, the DMRS pattern for a given transmission can comprise resource elements that are non-contiguous in the frequency domain.

The signal processing of FIG. 3 has a number of characteristic time intervals according to which processing is repeated. Resource assignment takes place in Transmit Time Intervals, which in LTE/LTE-A is typically 0.5 ms (one subframe) and the TTI is divided into "blocks" (or symbols) of time, each bock being the time used to transmit all of the subcarriers simultaneously.

In the transmitter path of FIG. 3, the SC-FDMA signal generation unit 340 performs N-point Inverse Discrete Fourier Transforms (IDFT) on the output of the resource element mapper 330 and converts the mapped subcarriers back into the time domain for transmission. However, prior to transmission the cyclic prefix addition unit 350 inserts a set of symbols called a cyclic prefix to provide a guard time to prevent inter-block interference from multipath propagation. The DAC/RF unit 360 converts the digital signal to analogue and up-converts to a radio frequency for transmission.

In the receive side of the processing chain of FIG. 3, the transmit process is reversed. The DMRS pattern applied by the transmitter (e.g. to each slot or to each subframe) in the resource element mapping unit 330 by the SL DMRS signal generation unit 320 can be signaled to the receiver via higher layer signaling (e.g. Radio Resource Control signaling). Alternatively, the modulation pattern can be inferred by the receiver from the received signal or can be pre-configured. The time interval across which the DMRS pattern is applied and repeated is not limited to one slot or one subframe, but can be for instance more than one subframe. In the receive path, the SL data corresponding to the UE doing the processing and/or resources of interest to the receiving UE are extracted by the SL data extraction unit 392 whilst the SL DMRS are extracted separately by the SL-DMRS extraction unit 394.

The channel estimator 396 of the receive path is used for the estimation of the frequency domain channel transfer function, receive signal time and frequency offsets and interference and noise signal characteristics (e.g. power level, receive signal covariance matrix) which are further used for the receive processing of the output of the SC-FDMA signal time-to-frequency domain conversion unit 380 (after resource element demapping). It does this by estimating frequency-domain taps directly using DMRS. Using known characteristics of the DMRS, the receiver can estimate the frequency domain channel around the location of the reference symbol in the slot or subframe. For radio channels subject to high frequency or time selectivity, a high density of DMRS in both frequency and time can provide estimates for the entire time-frequency grid of the physical resource block or subframe. Output of the channel estimator 396 is supplied to the SL data receive processing unit 398, where it is used to help in processing of the extracted SL data. The SL data receive processing circuitry 398, as one of its functions, performs equalization to counteract signal corruption due to frequency-selectivity of the radio channel. It does this using the frequency domain channel estimates provided by the channel estimator 396 using the DMRS. The SL data receive processing circuitry 398 also performs time/frequency offset compensation, DFT de-spreading, demapping, descrambling and decoding to output a signal that should resemble the transmitted signal, in terms of information content.

Figure 4A:
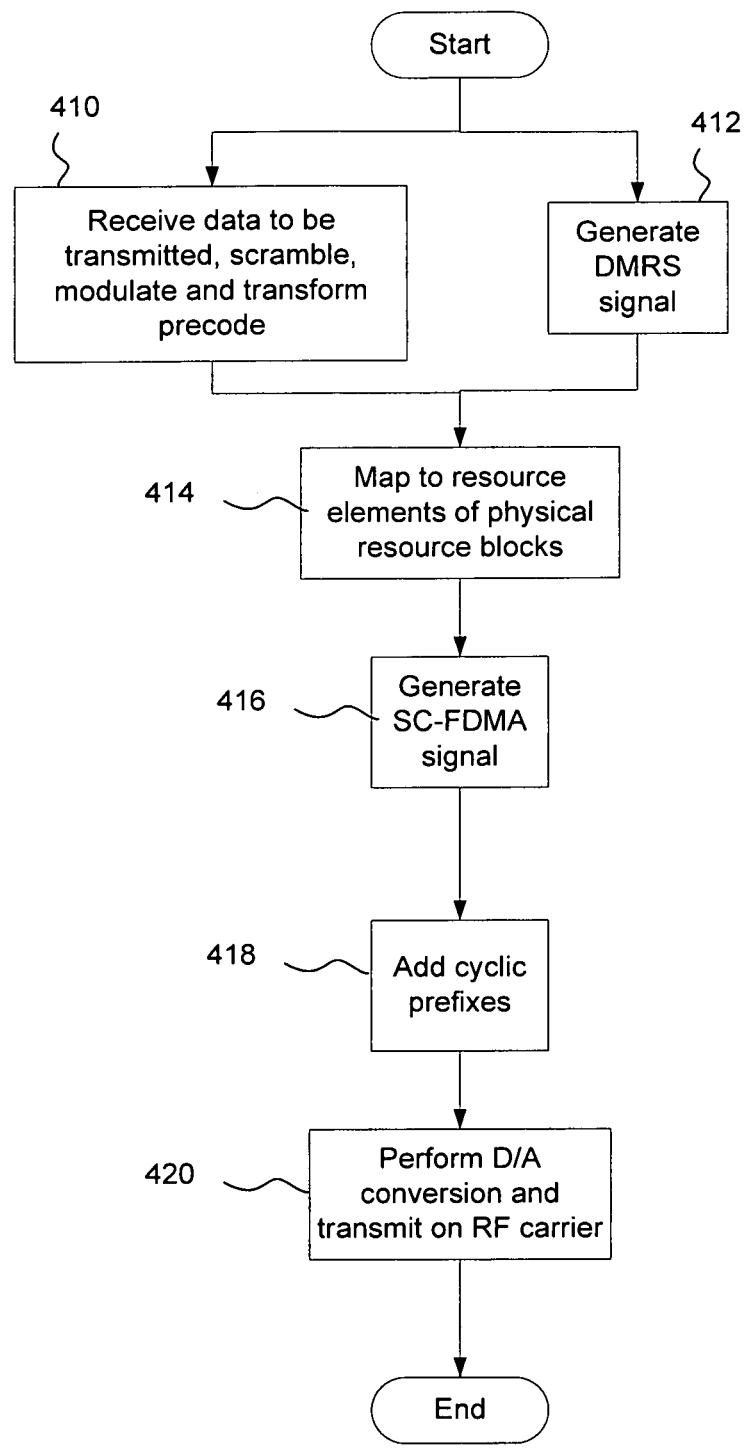
FIG. 4A is a flow chart schematically illustrating a transmit path for a wireless uplink or sideling signal including demodulation reference signal insertion.

FIG. 4A is a flow chart schematically illustrating a transmit path 400 for a wireless signal including demodulation reference signal insertion. The process starts when the data for the PSSCH SL channel is received at process element 410 whereupon, it is scrambled modulated and transform precoded. The SL data is single carrier FDMA modulated, whereas the DMRS data generated at process element 412 is OFDMA modulated (SC-FDMA waveform without DFT preceding). The data from process element 410 and the DMRS signal from process element 412 are both supplied to a process element 414, where the data is mapped to resource elements of the physical resource blocks with the DMRS signals being applied to resource elements of a slot or of a subframe according to a particular DMRS pattern in which the resource elements allocated to DMRS signals are more densely packed in the time domain than previously known DMRS patterns for LTE/LTE-A uplink channels. At process element 416 an SC-FDMA signal is generated via an N-point IDFT process, which converts data from the frequency domain to the time domain. At process element 418, cyclic prefixes are added to the SC-FDMA modulated data, whereupon it is passed to the DAC/RF unit for transmission across a wireless communication channel 362.

Figure 4B:
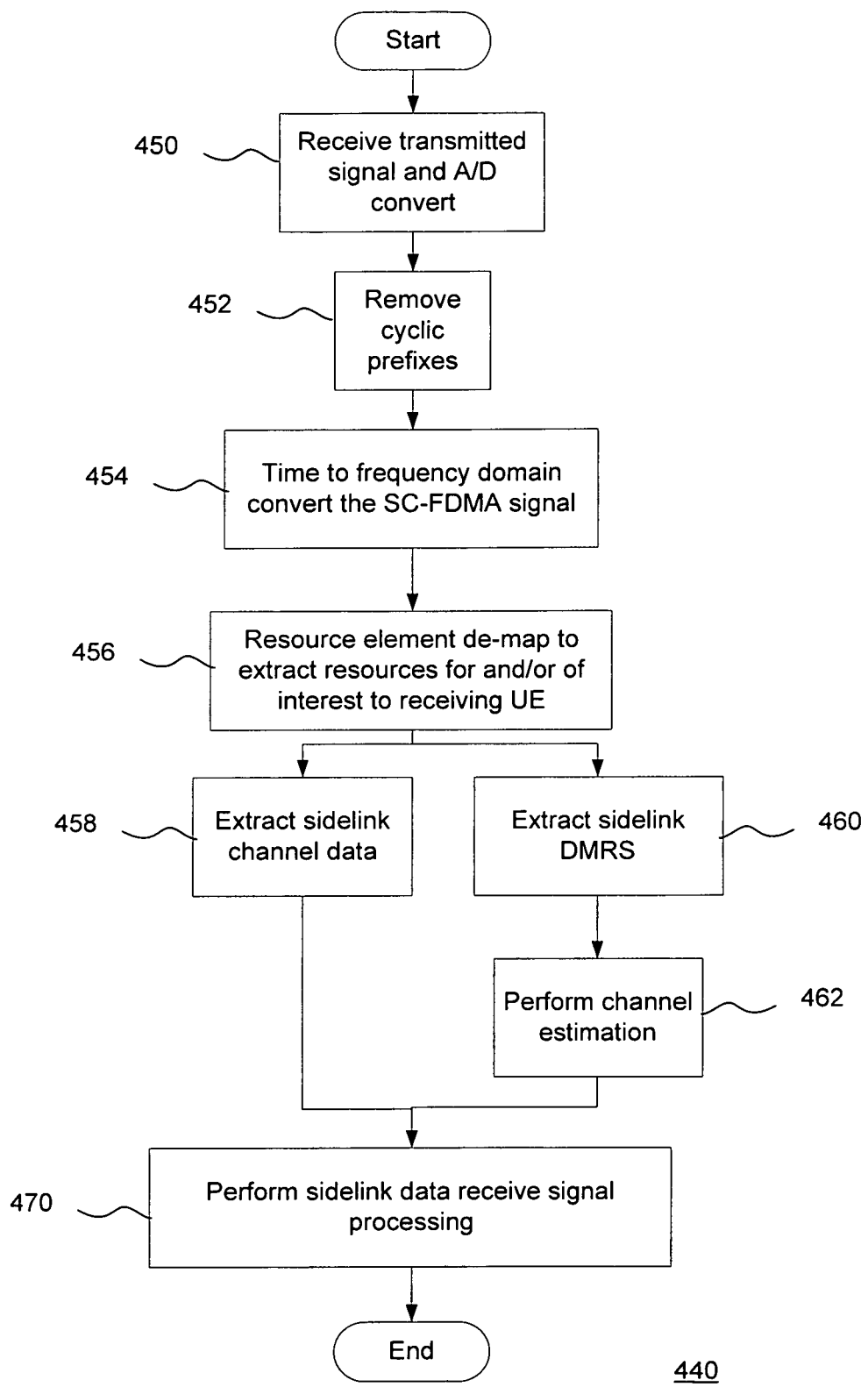
FIG. 4B is a flow chart schematically illustrating a receive path for a wireless sidelink or uplink signal from a user equipment including demodulation reference signal extraction for use in channel estimation.

FIG. 4B is a flow chart schematically illustrating a receive path 440 for a wireless signal including demodulation reference signal extraction for use in channel estimation. In a given UE, the receiving process starts and at process element 450, a received transmitted signal is converted from analogue form to digital form and RF converted back from a transmission frequency down to a baseband frequency. At process element 454, the received signal, which is in the time domain, is converted to a frequency domain by performing an N-point DFT. Next, at process element 456 the resource elements of the signal are de-mapped to extract the particular resource elements for and/or of direct interest to the receiving UE.

Once the resource elements have been de-mapped, two parallel paths are followed in the FIG. 4B flow chart: firstly, at process element 458 the SL channel data are extracted and passed to the process element 470; and secondly, the SL DMRS signals from the resource elements are extracted at process element 460 and used to perform channel estimation at a process element 462. Results of the channel estimation, like output of the SL channel data extraction process element 458, are supplied to the process element 470. At process element 470 a SL data receive signal processing sequence is applied comprising time/frequency offset compensation, equalisation, DFT de-spreading, demapping, descrambling and decoding. Thus a representation of the transmitted signal is recovered at the output of process element 470. It will be appreciated that the transmitted signal and the received signal may not be identical due to the effects of the wireless channel 362, for example, due to interference and/or uncorrected transmission errors.

The "legacy" SL DMRS patterns for the Normal and Extended Cyclic Prefix, CP cases are be illustrated in FIGS. 5A and 5B for one physical resource block (PRB) pair (12 Resource Elements (REs) in frequency, 1 subframe in time). These "legacy" DMRS patterns are used, for example, for LTE Physical Uplink Shared Channel (PUSCH) demodulation. For the Normal cyclic prefix (CP) case as shown in FIG. 5A, the legacy DMRS may occupy the symbols 3 and 10 (further denoted "DMRS 3/10"). For the Extended CP case as shown in FIG. 5B, the legacy DMRS may occupy the symbols 2 and 8 ("DMRS 2/8"). The last SC-FDMA symbol 512, 514 in a SL subframe may serve as a guard period and may not be used for SL transmission. The remaining symbols in a subframe may be occupied by different SL transmissions (e.g. PSSCH). In FIGS. 5A and 5B, the symbols in the subframe are enumerated from 0 to 13 for the Normal CP case and from 0 to 11 for the Extended CP case.

In embodiments, DMRS patterns may be modified with different time/frequency mappings to improve the channel estimation accuracy. Following the legacy design, the DMRS may have frequency contiguous transmission pattern and may occupy all REs in a PRB pair in the allocated symbol (i.e. 12 contiguous REs in one symbol). In embodiments, a number of enhanced DMRS patterns may be used for the Normal CP case as described in Table 1 and FIGS. 6A to 6E. In embodiments, the DMRS patterns for the Extended case are described in the Table 2 and FIG. 7A to 7F.

TABLE 1 below shows Non-limiting Examples of
Enhanced SL DMRS patterns (Normal CP)

Figure 6A:
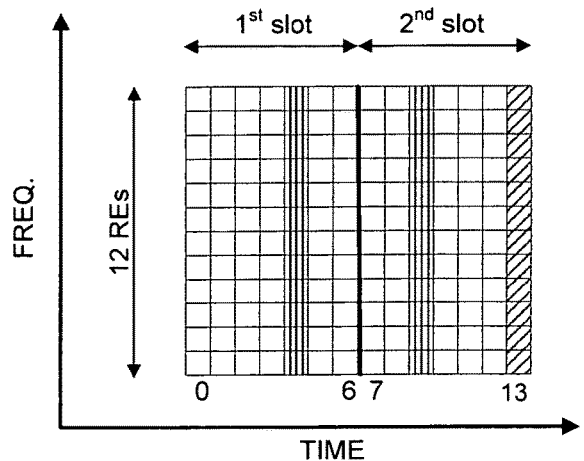
FIGS. 6A to 6E schematically illustrate embodiments of demodulation reference signal patterns in sidelink or uplink subframes for Normal Cyclic Prefix.
Figure 6B:
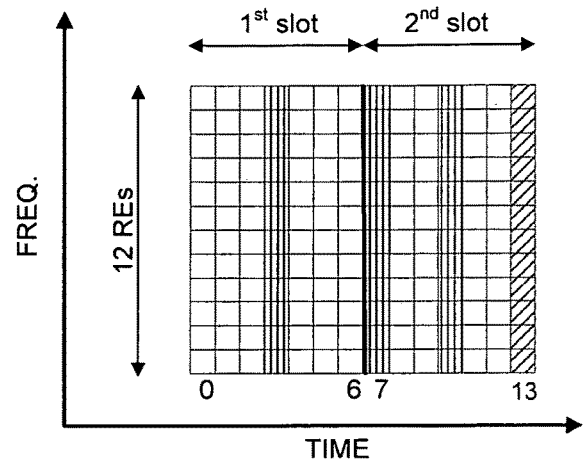
Figure 6C:
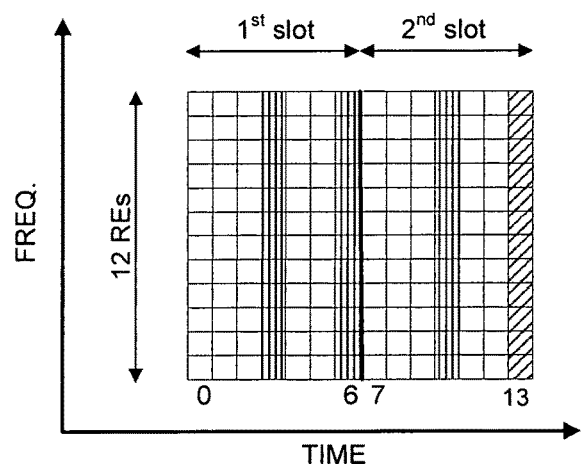
Figure 6D:
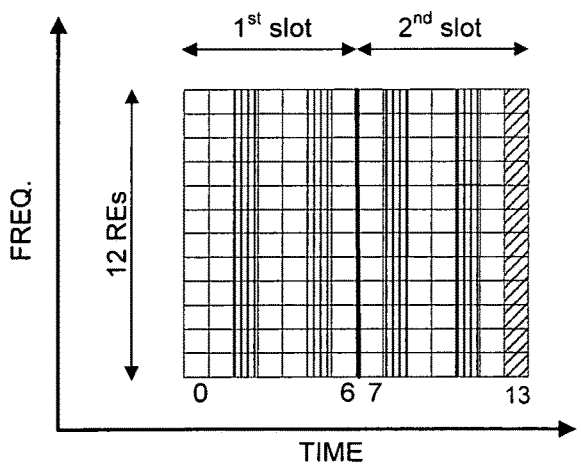
Figure 6E:
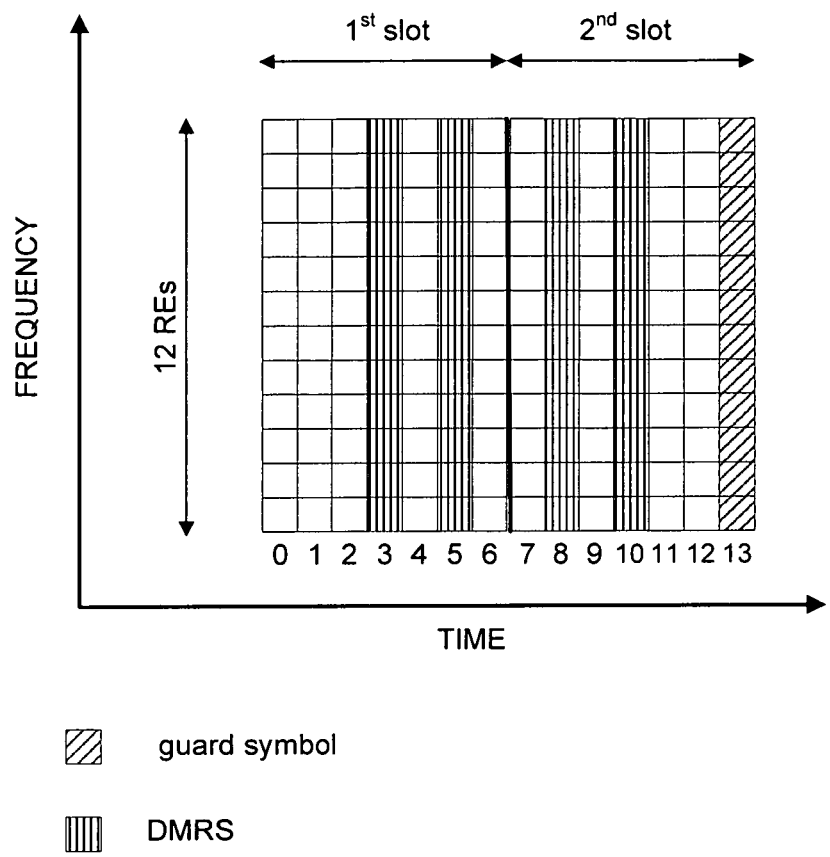

| Title | Description | Notes |
|---|---|---|
| "DMRS 3/7/10" As shown in FIG. 6B | DMRS occupies symbols 3, 7, and 10 | Three DMRS symbols per subframe. One additional DMRS symbol is introduced between the two legacy DMRS symbols. The DMRS time domain density is increased at the cost of the increased overhead. |
| "DMRS 3/6/10" As shown in FIG. 6C | DMRS occupies symbols 3, 6, and 10 | Same as DMRS 3/7/10 |
| "DMRS 2/5/8/11" As shown in FIG. 6D | DMRS occupies symbols 2, 5, 8, and 11 | Four DMRS symbols per subframe with uniform distribution. |
| "DMRS 3/5/8/10" As shown in FIG. 6E | DMRS occupies symbols 3, 5, 8, and 10 | Four DMRS symbols per subframe. Two DMRS symbols have same position as legacy DMRS. |
| "DMRS 4/9" As shown FIG. 6A | DMRS occupies in symbols 4 and 9. | Two DMRS symbols per subframe. The solution has same overhead as legacy DMRS while the inter-DMRS distance is reduced hence increasing the robustness to the high Doppler fading |

TABLE 2 below shows Non-limiting Examples of
Enhanced SL DMRS patterns (Extended CP)

Figure 7A:
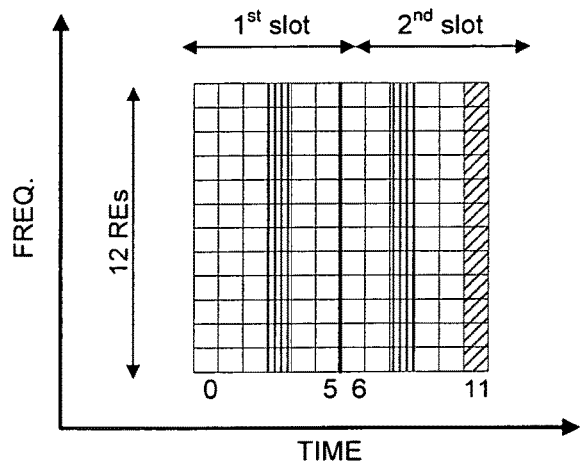
FIGS. 7A to 7F schematically illustrate embodiments of demodulation reference signal patterns in sidelink or uplink subframes for Extended Cyclic Prefix.
Figure 7B:
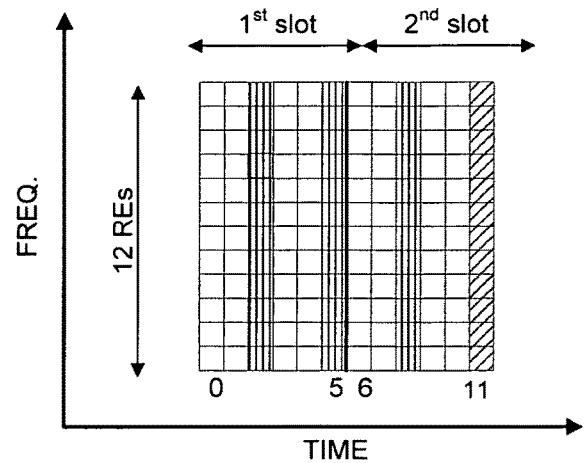
Figure 7C:
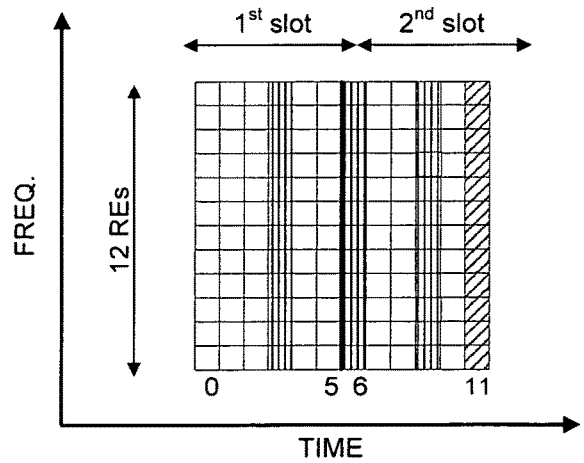
Figure 7D:
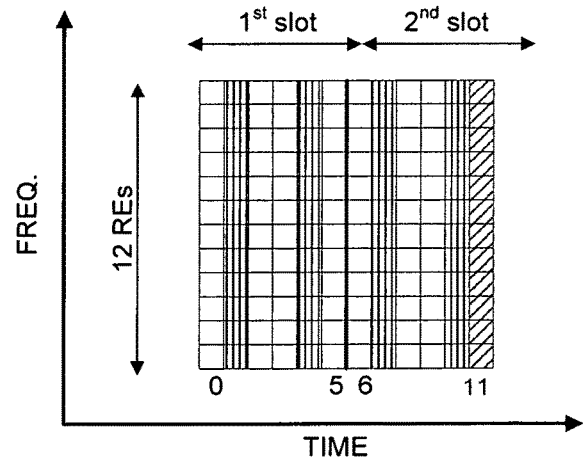
Figure 7E:
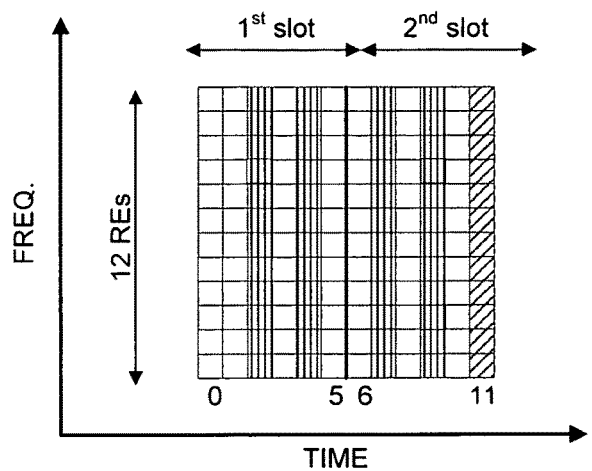
Figure 7F:
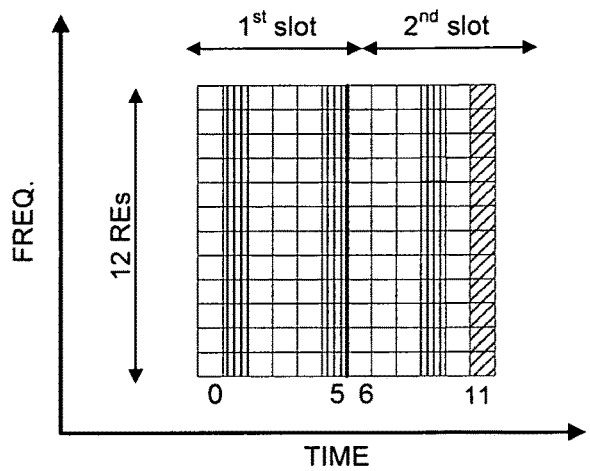

| Title | Description | Notes |
|---|---|---|
| "DMRS 2/5/8" As shown in FIG. 7B | DMRS occupies symbols 2, 5, and 8 | Three DMRS symbols per subframe. One additional DMRS symbol is introduced between the two legacy DMRS symbols. The DMRS time domain density is increased at the cost of the increased overhead. |
| "DMRS 3/6/9" As shown in FIG. 7C | DMRS occupies symbols 3, 6, and 9 | Three DMRS symbols per subframe. Try to achieve uniform distribution |
| "DMRS 1/5/9" As shown in FIG. 7F | DMRS occupies symbols 1, 5, and 9 | Three DMRS symbols per subframe. |
| "DMRS 1/4/7/10" As shown in FIG. 7D | DMRS occupies symbols 1, 4, 7, and 10 | Four DMRS symbols per subframe with equal 2 symbols spacing. |
| "DMRS 2/4/7/9" As shown in FIG. 7E | DMRS occupies symbols 2, 4, 7, and 9 | Four DMRS symbols per subframe. |
| "DMRS 3/8" As shown in FIG. 7A | DMRS occupies symbols 3 and 8. | Two DMRS symbols per subframe. The solution has same overhead as legacy DMRS while the inter-DMRS distance is reduced hence increasing the robustness to the high Doppler fading |

Figure 8A:
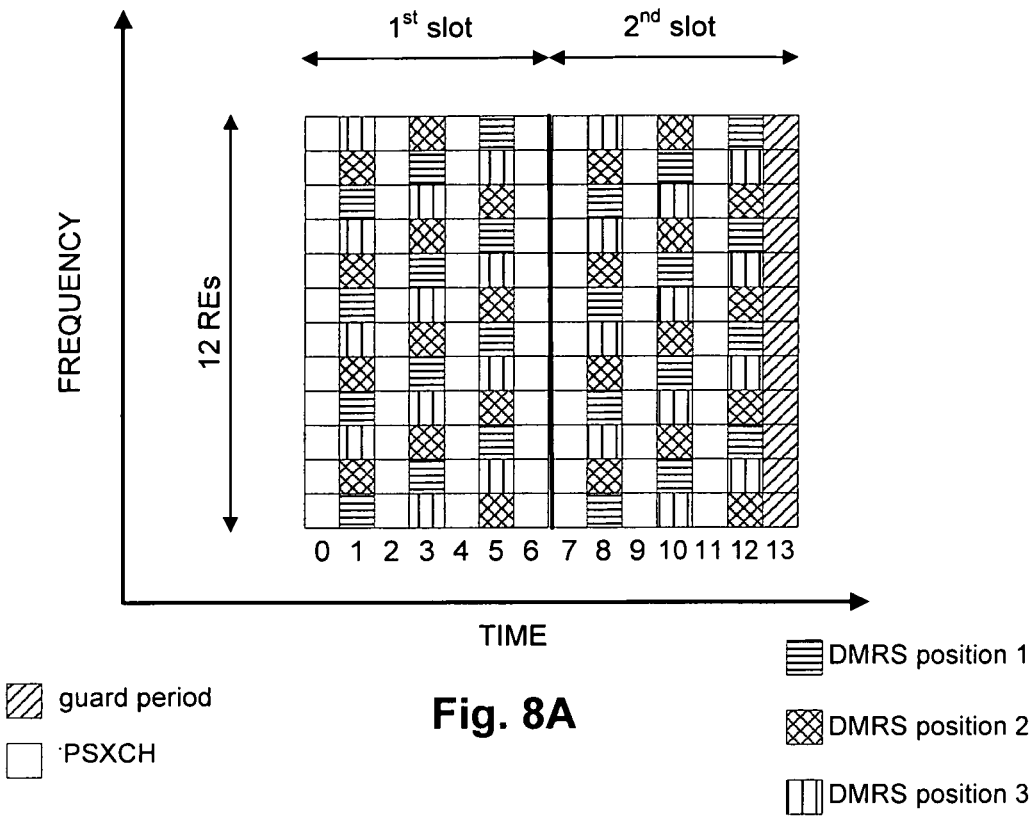
FIG. 8A to 8F schematically illustrate embodiments for demodulation reference signal patterns in a subframe that are non-contiguous in frequency for a given transmission and for Normal Cyclic Prefix.
Figure 8B:
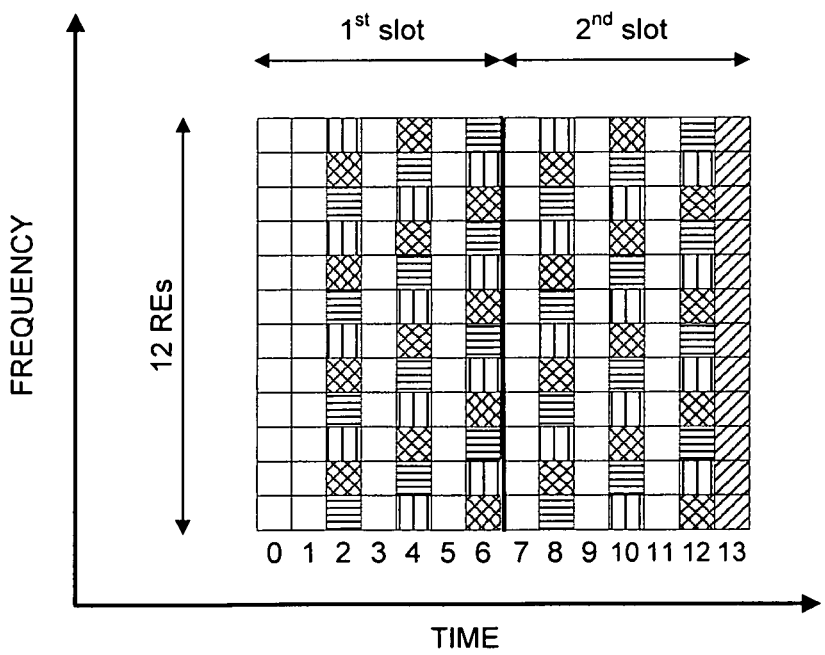
Figure 8C:
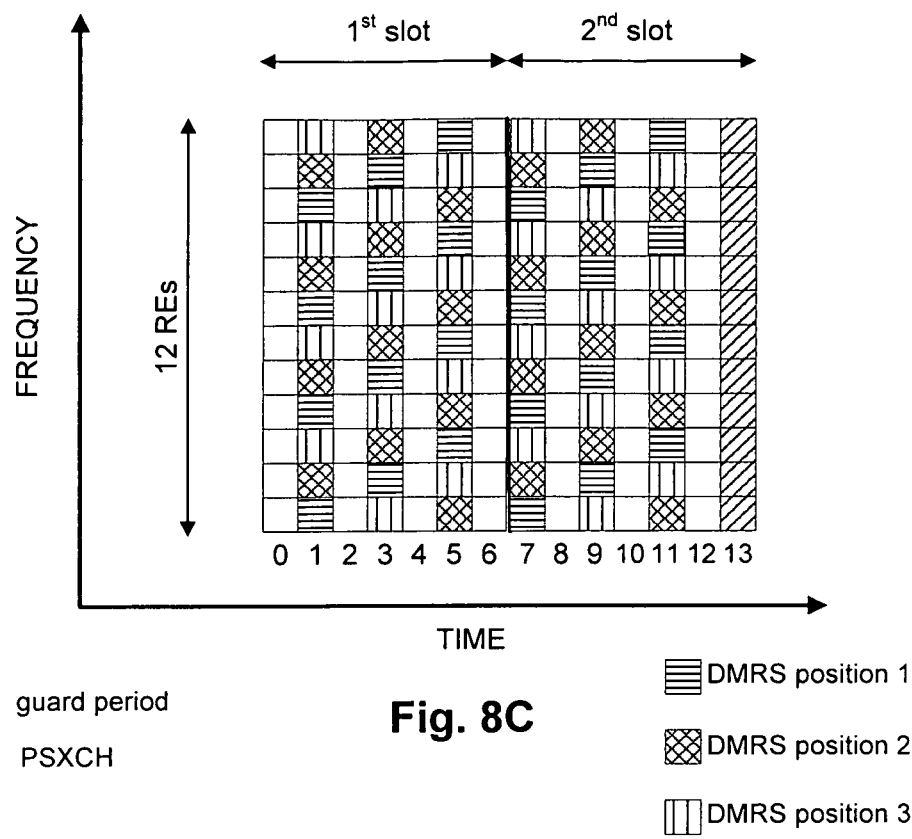
Figure 8D:
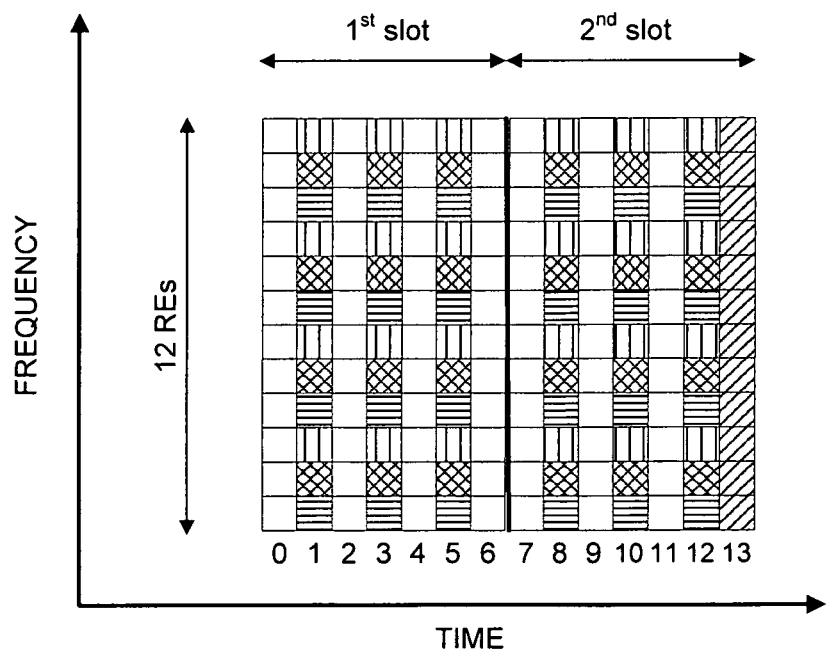
Figure 8E:
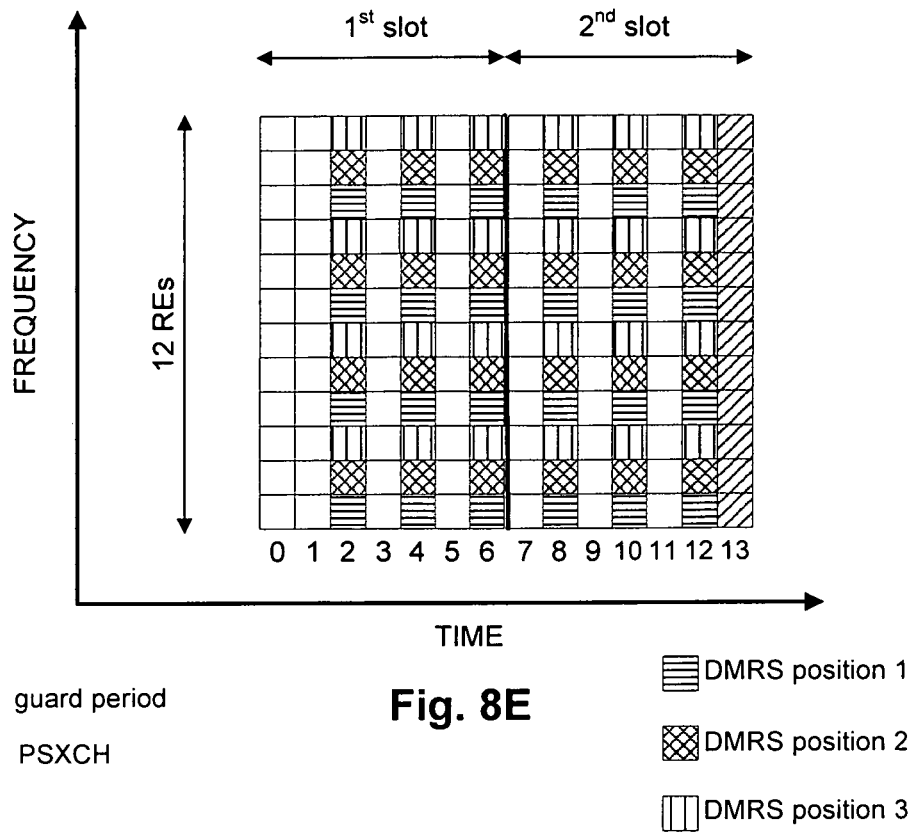
Figure 8F:
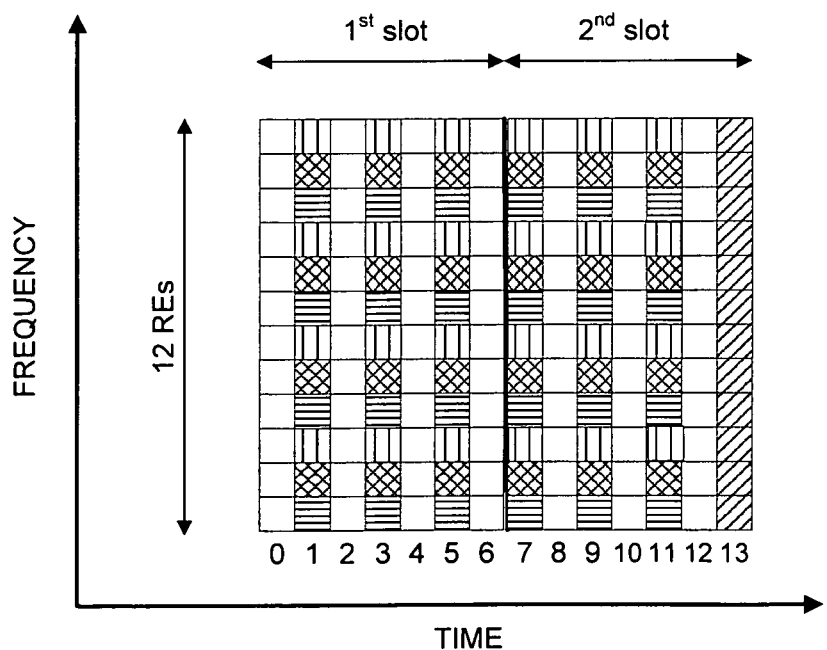
Figure 9A:
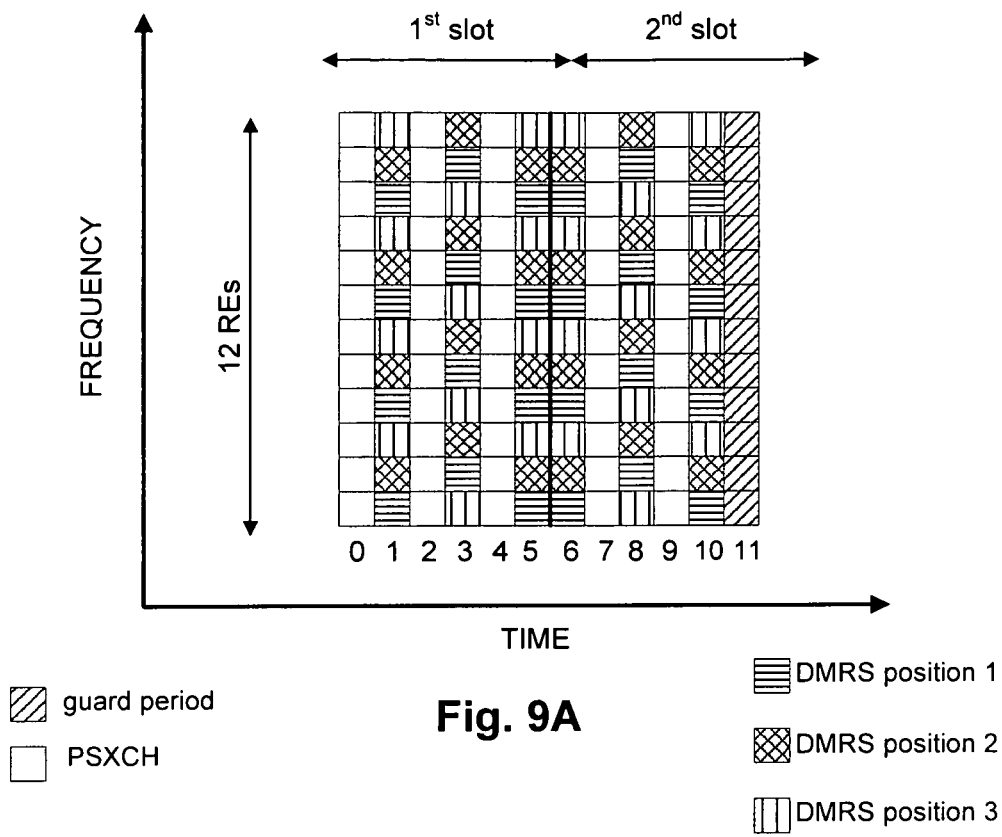
FIGS. 9A to 9F schematically illustrate embodiments for demodulation reference signal patterns in a subframe that are non-contiguous in frequency for a given transmission and for Extended Cyclic Prefix.
Figure 9B:
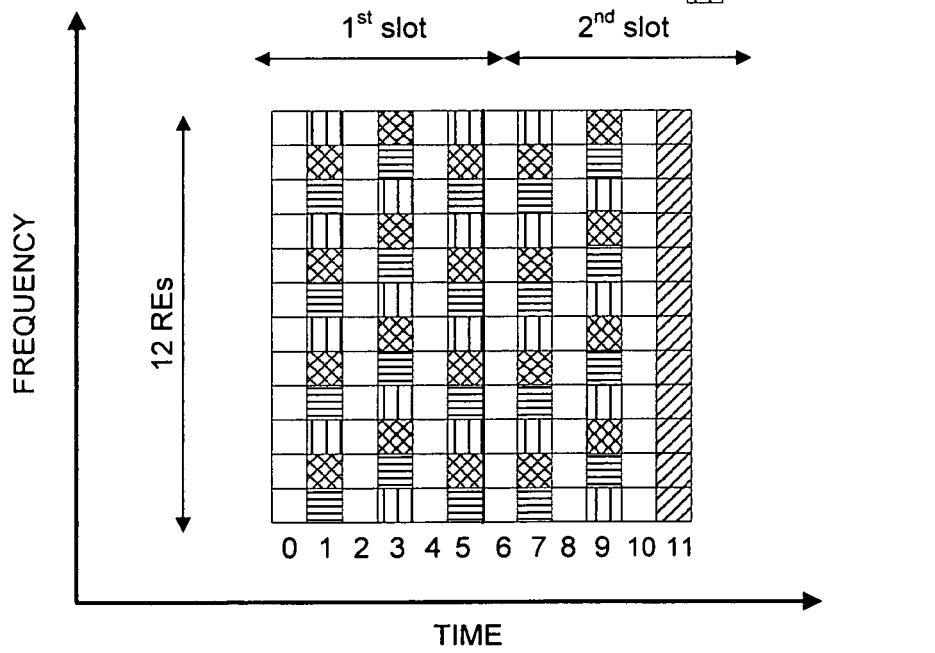
Figure 9C:
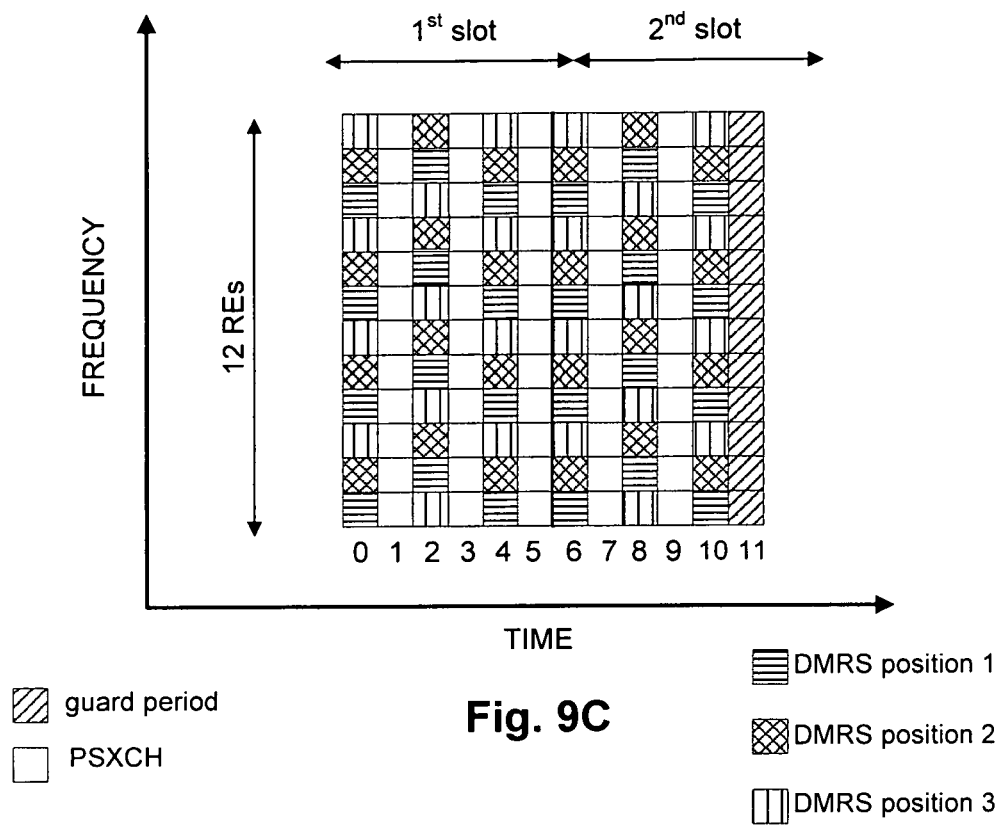
Figure 9D:
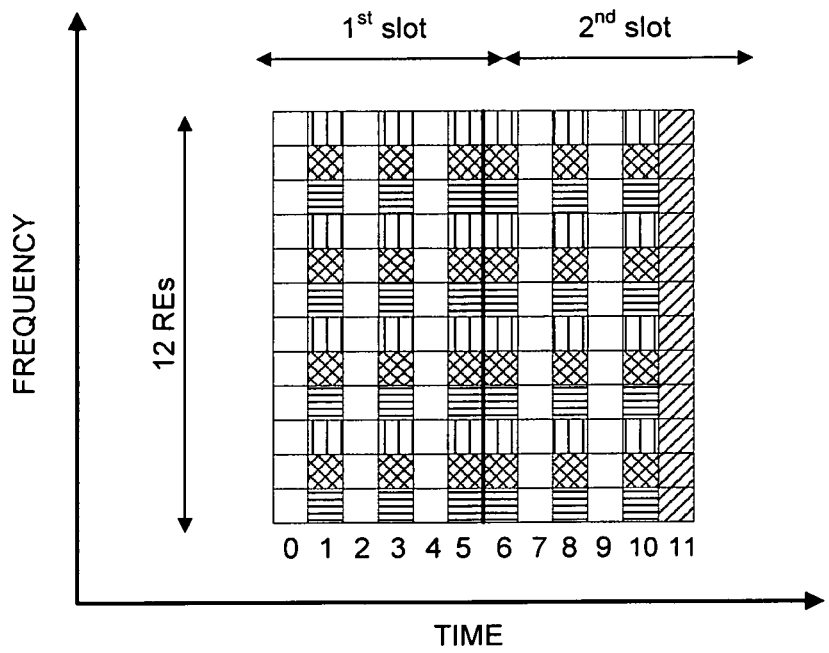
Figure 9E:
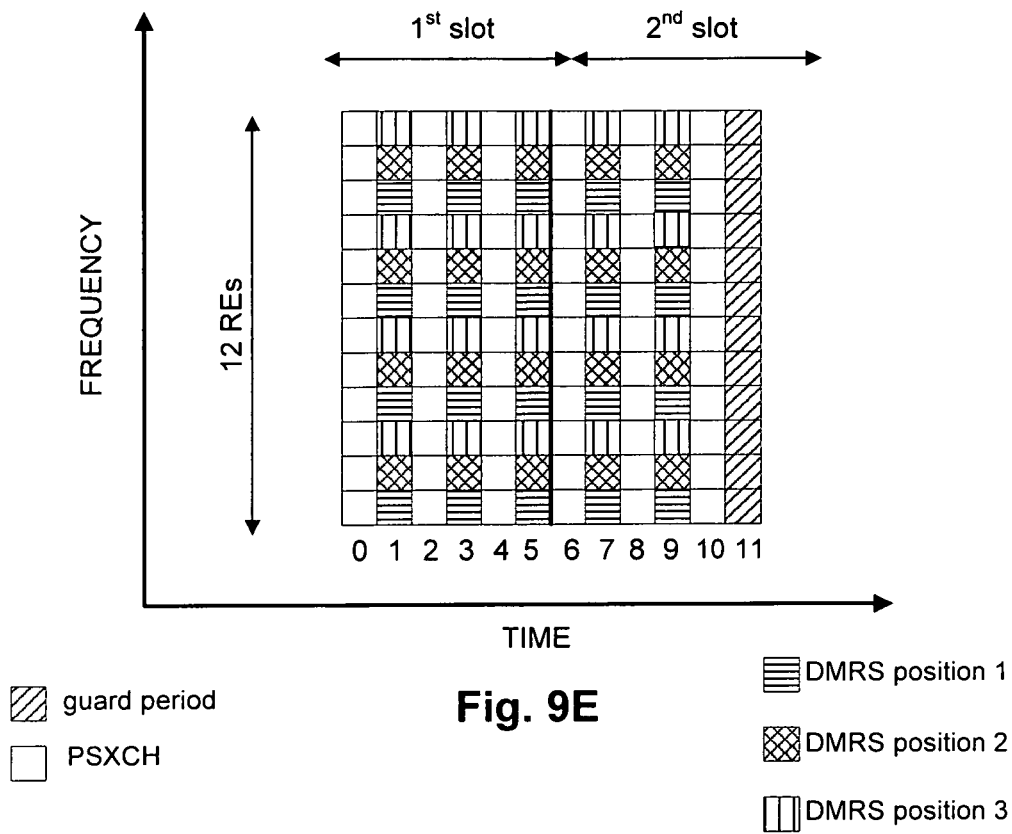
Figure 9F:
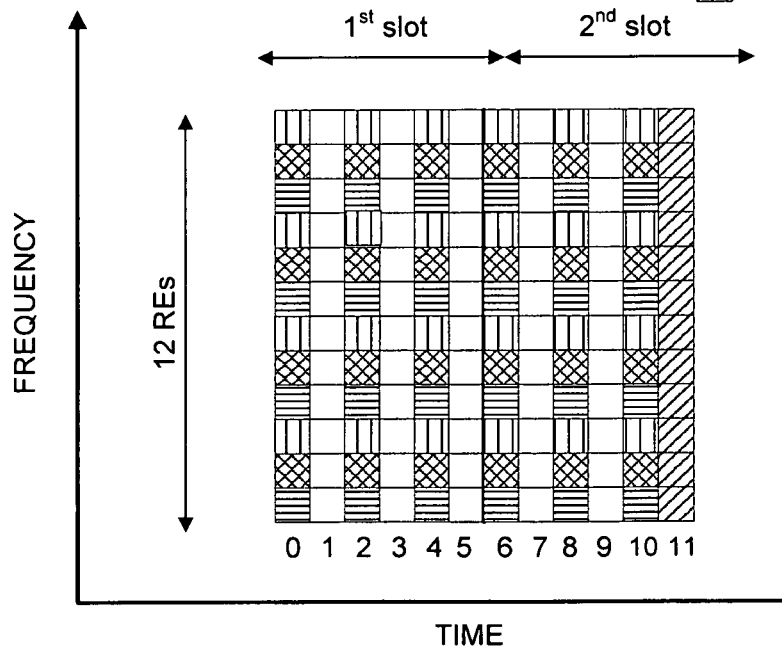

In embodiments, the DMRS patterns, for example those shown in Table 1 and Table 2 above, may rely on replicating the legacy LTE design where DMRS may occupy a single symbol across all twelve subcarrier frequencies and focus on increasing the time domain density of the DMRS transmissions. In embodiments, as may be shown below with reference to FIG. 8A to 8F and FIG. 9A to 9F, the DMRS patterns with non-frequency contiguous transmissions may provide somewhat better channel estimation accuracy, which may be at the cost of increased Peak to Average Power Ration (PAPR). An increased PAPR can make transmission and reception less power-efficient. Embodiment patterns may be illustrated in FIGS. 8A-F and 9A-F. The patterns may include several candidate DMRS positions X, for example, equal to DMRS position 1, DMRS position 2 and DMRS position 3. For one particular transmission it may be expected that a single position will be used, in the meantime different DMRS positions may be used for different V2V transmissions (for example, by different UEs). It can be seen in the embodiments of FIGS. 8A to 8F and similarly in FIGS. 9A to 9F, that the different DMRS-patterns enable selection of allocations of DMRS resource elements for a given transmission which are non-contiguous in the frequency domain. In particular, for a given one of the three different illustrated DMRS positions, the DMRS resource elements are restricted to certain symbols within the subframe and are non-contiguous in frequency. However, taken together, all three DMRS positions within a given subframe, span all twelve subcarriers in the frequency domain. In the embodiments of FIGS. 8D to 8F all symbols available for DMRS transmission and corresponding to a given frequency subcarrier are allocated to the same transmitter (i.e. correspond to a given DMRS position). By way of contrast, in the embodiments of FIGS. 8A to 8C and FIGS. 9A to 9C, for a given sub-carrier, the set of slots available for DMRS are allocated to transmitters (different DMRS positions) on a round-robin basis with position 1, position 2 and position 3 being allocated sequentially along the rows of the resource block, interspersed by PSXCH data and with the guard symbol in the end position (symbol index 13 for normal CP or symbol index 11 for extended CP).

FIGS. 8A-8F (normal CP) and 9A to 9F (extended CP) show three different DMRS positions, but it will be appreciated that other numbers of positions (e.g. two positions or four positions) may be implemented from which to select and embodiments are not limited to three DMRS positions for non-contiguous frequency arrangements. In FIGS. 8A to 8F the DMRS signals are allocated on a per-subframe basis for normal CP, so the symbols of the subframe are indexed from 0 through to 13. In the FIGS. 8A and 8D embodiments, all subcarriers of symbols 1, 3, 5, 8, 10 and 12 of each subframe are allocated to DMRS (to include the three different DMRS positions within the pattern). In the FIGS. 8B and 8E, embodiments all subcarriers of symbols 2, 4, 6, 8, 10 and 12 of each subframe are allocated to DMRS (to include the three different DMRS positions within the pattern). In the FIGS. 8C and 8F embodiments, all subcarriers of symbols 1, 3, 5, 7, 9 and 11 of each subframe are allocated to DMRS (to include the three different DMRS positions within the pattern).

In FIGS. 9A to 9F the DMRS signals are allocated on a per-subframe basis for extended CP, so the symbols of the subframe are indexed from 0 through to 11. In the FIGS. 9A and 9D embodiments, all subcarriers of symbols 1, 3, 5, 6, 8 and 10 of each subframe are allocated to DMRS (to include the three different DMRS positions within the pattern). In the FIGS. 9B and 9E embodiments, all subcarriers of symbols 1, 3, 5, 7 and 9 of each subframe are allocated to DMRS (to include the three different DMRS positions within the pattern). In the FIGS. 9C and 9F embodiments, all subcarriers of symbols 0, 2, 4, 6, 8 and 10 of each subframe are allocated to DMRS (to include the three different DMRS positions within the pattern).

In embodiments, to adjust to the V2V criteria, the LTE SL design may be modified to support per-slot resource allocation granularity, which may include introducing new DMRS patterns for each slot. Non-limiting examples of patterns for per-slot resource allocation are illustrated in FIGS. 10A to 10F. The per-slot granularity of the DMRS patterns illustrated in FIGS. 10A to 10F can help to address any half duplex issues and reduce any in-band emission problem, because more resource element allocations may be available along a time domain. In-band emission interference corresponds to leakage in a given transmitter within the channel bandwidth, and the resulting leakage can interfere with other transmitters and can thus degrade performance of D2D communications, so there is a desire to control in-band emission.

LTE supports half-duplex FDD at the UE in which transmission and reception of a radio signal at the terminal are separated both in frequency and in time. Half-duplex FDD allows for reduced UE complexity. However, channel estimation in half-duplex FDD can be difficult to perform efficiently. Alternatively, even if a subframe-level allocation does not change, it may be possible to enable intra-slot hopping without imposing the loss in terms of channel estimation.

Figure 10A:
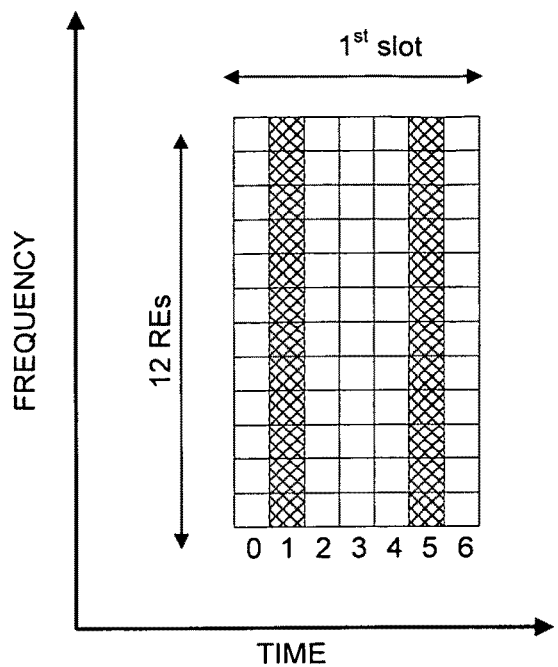
FIGS. 10A to 10G schematically illustrate embodiments of demodulation reference signal patterns allocated on a per-slot rather than a per-subframe basis.
Figure 10B:
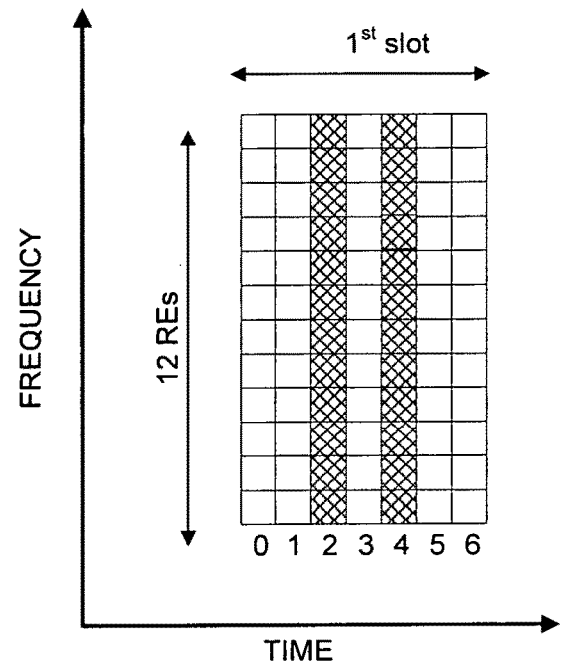
Figure 10C:
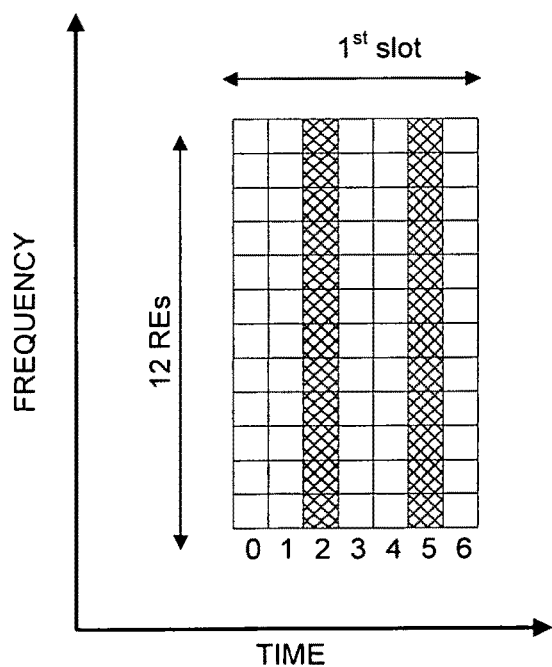
Figure 10D:
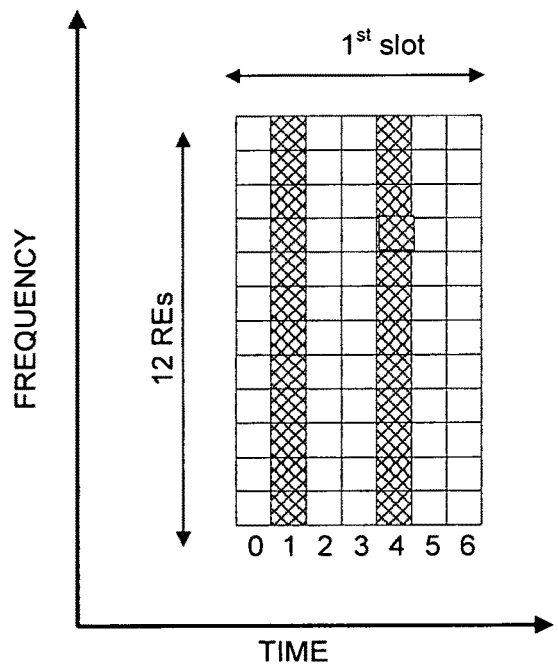
Figure 10E:
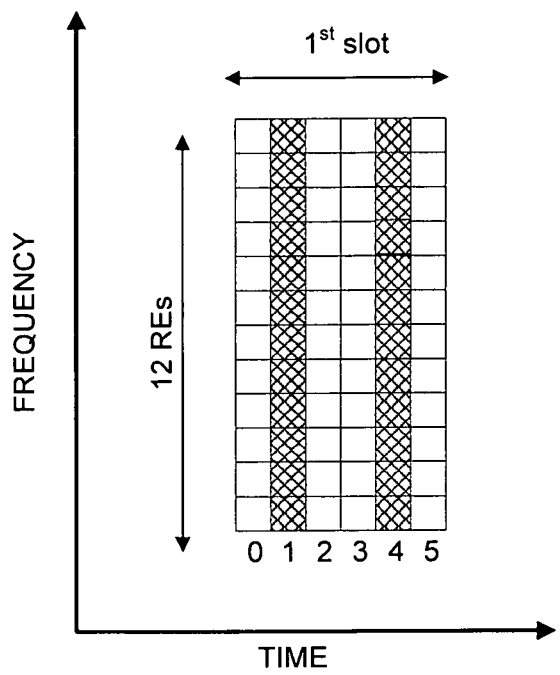
Figure 10F:
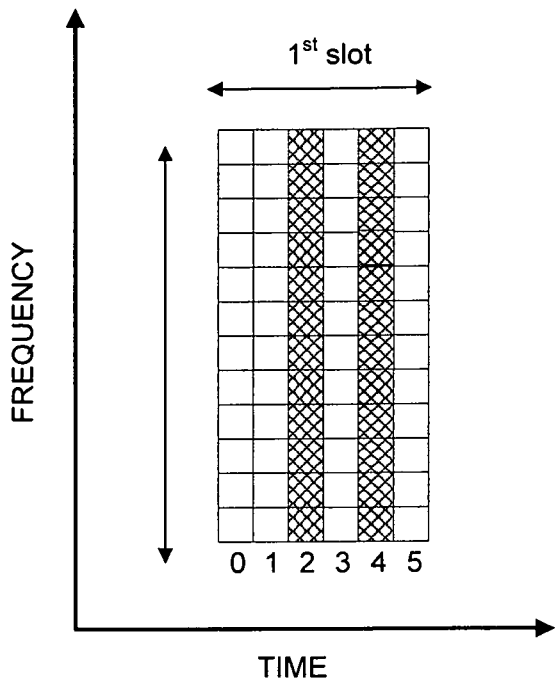
Figure 10G:
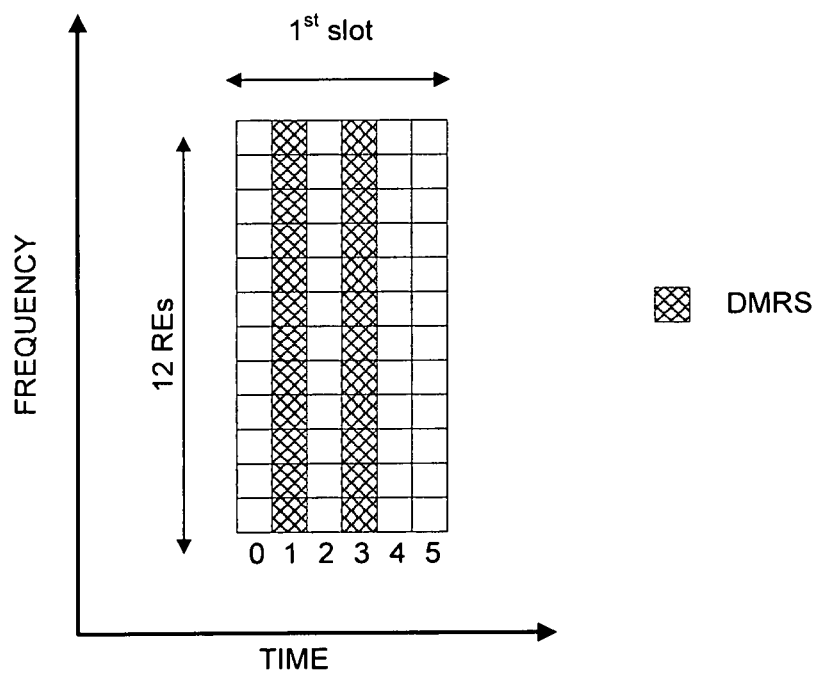

In the per-slot resource allocations of FIGS. 10A to 10F the DMRS pattern allocations are as follows. FIG. 10A has a slot comprising seven symbols indexed from 0 to 6 and a normal CP length and allocates all twelve frequency sub-carriers (ie. resource elements contiguous in frequency) of symbol 1 and symbol 5 to DMRS signals. FIG. 10B has a slot comprising seven symbols indexed from 0 to 6 and a normal CP length and allocates all twelve frequency sub-carriers of symbol 2 and symbol 4 to DMRS signals. FIG. 10C has a slot comprising seven symbols indexed from 0 to 6 and a normal CP length and allocates all twelve frequency subcarriers of symbol 2 and symbol 5 to DMRS signals. FIG. 10D has a slot comprising seven symbols indexed from 0 to 6 and a normal CP length and allocates all twelve frequency subcarriers of symbol 1 and symbol 4 to DMRS signals. FIG. 10E has a slot comprising six symbols indexed from 0 to 5 and an extended CP length and allocates all twelve frequency subcarriers of symbol 1 and symbol 4 to DMRS signals. FIG. 10F has a slot comprising six symbols indexed from 0 to 5 and an extended CP length and allocates all twelve frequency subcarriers of symbol 2 and symbol 4 to DMRS signals. FIG. 10G has a slot comprising six symbols indexed from 0 to 5 and an extended CP length and allocates all twelve frequency subcarriers of symbol 1 and symbol 3 to DMRS signal.

In embodiments, different mechanisms of the DMRS pattern selection for V2V transmission may be used.

In embodiments, a fixed DMRS pattern may be used. For example, the V2V transmitter may use a preconfigured or configured fixed DMRS pattern.

In embodiments, an adaptive DMRS pattern selection may be used. For example, the transmitter may adaptively select the target DMRS pattern based some criteria (e.g. speed, relative speed, frequency band, etc.) which may or may not involve knowledge of the receiver parameters. In embodiments, an adaptive DMRS configuration may be used for different DMRS structures depending on the value of carrier frequency. For higher carrier frequencies (e.g. around 6 GHz) the more dense DMRS structure may be used. For lower carrier frequencies, the legacy DMRS structure or less dense DMRS structure may be used. In embodiments, the information about DMRS physical structure may be configurable by the network.

In embodiments, the V2V receiver may have full knowledge on the DMRS pattern used at the V2V transmitter (e.g. via higher layer signaling). In other embodiments, the V2V receiver may detect the presence of one or another pattern and may perform further demodulation accordingly. In the latter case, the receiver may perform measurements of the DMRS Reference Signal Received Power (RSRP) following a number of DMRS pattern hypothesis (including absence) and may choose the one based on the measurements results.

In embodiments, the SC-FDMA symbols of transmission signal subframes located closer to the DMRS positions may have better channel estimation accuracy and therefore the corresponding Log Likelihood Ratio (LLR) values in those symbols may be more reliable. Therefore, the most important bits may be mapped to resource elements located at the position close to the DMRS signal. In embodiments, to extract gain from this observation, without affecting legacy DMRS structure, the rate matching and/or symbol mapping rules can be modified so that symbols, which are distant from DMRS are either not used for transmission or non-systematic bits are transmitted within these bits with higher intensity.

Figure 11A:
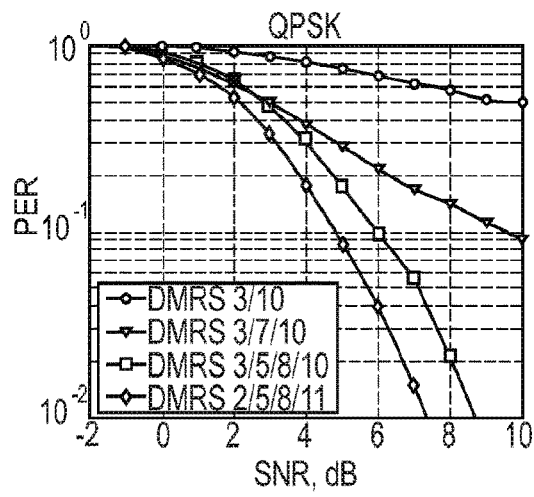
FIGS. 11A to 11D are empirical results from simulations that illustrate the Physical Sidelink Shared Channel (PSSCH) channel Packet Error Rate (PER) performance comparison in the case of using legacy and enhanced demodulation reference signal patterns for the case of single subframe processing and soft combining over 4 subframes.
Figure 11B:
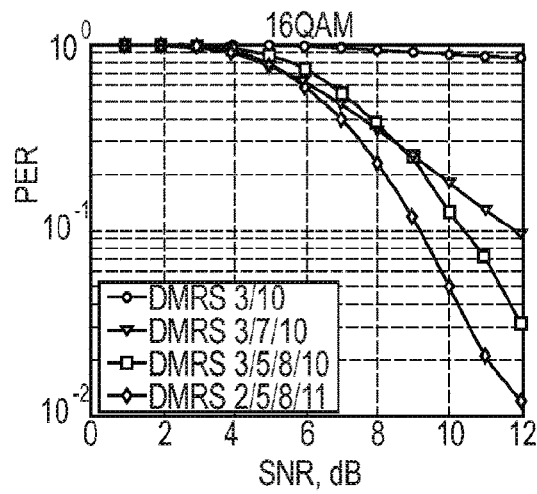
Figure 11C:
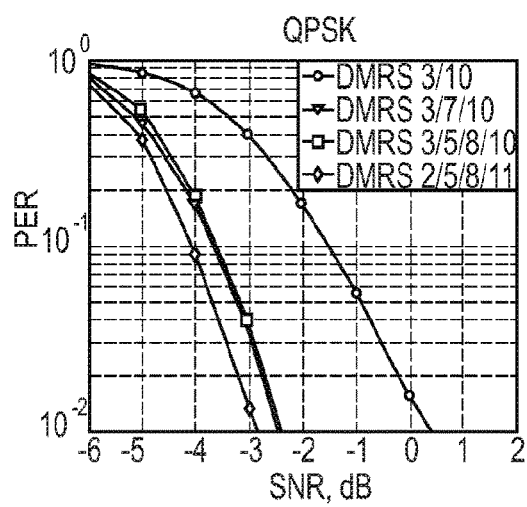
Figure 11D:
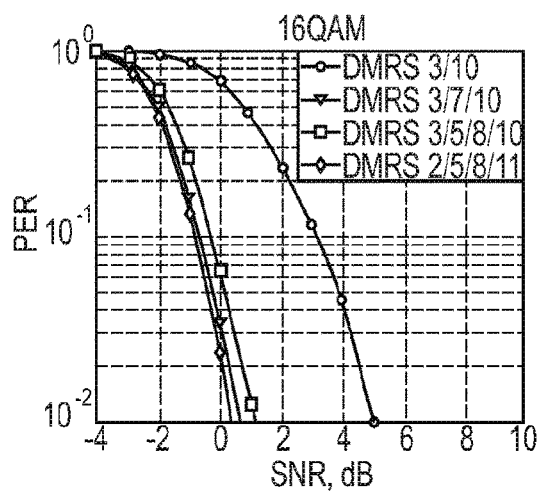

FIGS. 11A to 11D may illustrate the PSSCH channel packet error rate (PER) performance comparison in the case of using legacy and enhanced DMRS patterns for the case of single subframe processing and soft combining over 4 subframes. The results may be provided for the case of the Extended Vehicular A model (EVA)-1500 Hz propagation channel and for QPSK and 16QAM transmissions. The EVA model is a channel model for test and verification of UE and eNodeB radio transmission and reception as defined in 3GPP TS 36.101, "User Equipment (UE) Radio Transmission and Reception" and in 3GPP TS 36.104. "Base Station (BS) radio transmission and reception":

In the embodiments of FIGS. 11A and 11B using legacy DMRS patterns with 1 TTI (Transmission Time Interval) processing both QPSK and 16QAM transmissions there may be very high PER performance (error floor) that may not reach target 1% BLER (Block Error Rate). In the embodiments of FIGS. 11C and 11D using soft combining over 4 TTIs, the performance may improve and 1% BLER may be achieved, but the associated SNR may be relatively high. In embodiments, using enhanced DMRS patterns may allow improving the demodulation performance dramatically. In embodiments, for the 1 TTI processing case, enhanced patterns may improve the demodulation performance and may allow achieving target 1% BLER. In embodiments, for the 4 TTI processing case of FIGS. 11C and 11D, the 3-5 dB SNR improvement may be achieved.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments of this disclosure may include changes to the physical structure of SL demodulation reference signal (DMRS), which may support reliable operation in the high Doppler scenarios (e.g. up to 1500 Hz) for reliable operation of V2V services. Embodiments may include enhancements to the SL DMRS. The DMRS may be used to facilitate better channel estimation for different SL physical channels, e.g. PSSCH, PSCCH, PSDCH, and PSBCH (herein referred to as PSXCH). In embodiments, similar enhancements may be applied for the UL DMRS.

Figure 12:
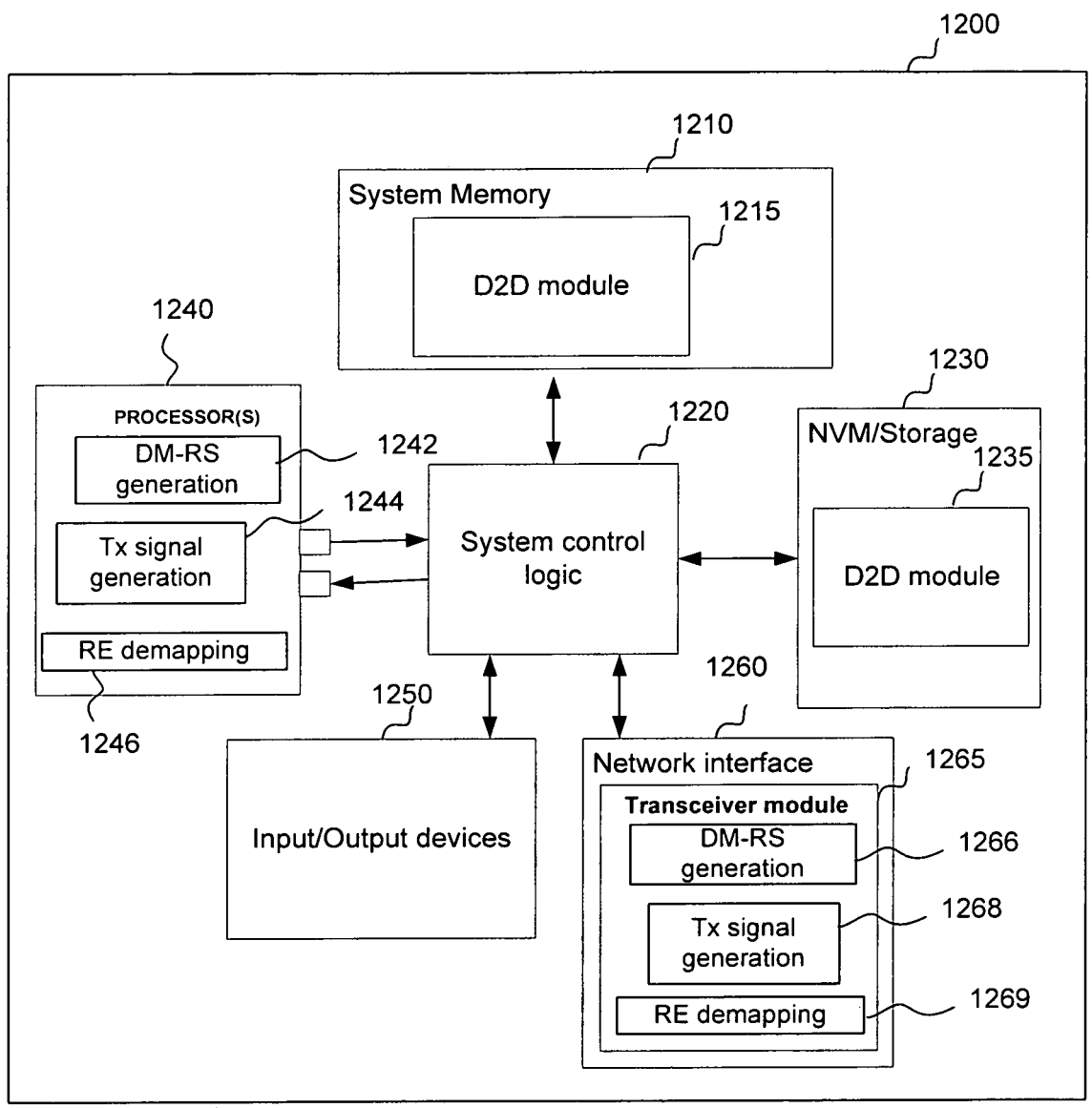
FIG. 12 schematically illustrates an example system according to some embodiments.

FIG. 12 illustrates an example system 1200 according to some embodiments. System 1200 includes one or more processor(s) 1240, system control logic 1220 coupled with at least one of the processor(s) 1240, system memory 1210 coupled with system control logic 1220, non-volatile memory (NVM)/storage 1230 coupled with system control logic 1220, and a network interface 1260 coupled with system control logic 1220. The system control logic 1220 may also be coupled to Input/Output devices 1250.

Processor(s) 1240 may include one or more single-core or multi-core processors. Processor(s) 1240 may include any combination of general-purpose processors and dedicated processors (e.g., graphics processors, application processors, baseband processors, etc.). Processors 1240 may be operable to carry out the above described methods, using suitable instructions or programs (i.e. operate via use of processor, or other logic, instructions). The instructions may be stored in system memory 1210, as system memory portion (D2D module) 1215, or additionally or alternatively may be stored in (NVM)/storage 1230, as NVM instruction portion (D2D module) 1235. D2D modules 1215 and/or 1235 may include program instructions to cause a processor 1240 to generate or to extract a DMRS signal having a pattern in which DMRS resource elements are separated by less than one slot on a time axis and to transmit and receive a wireless communication in which the DMRS patterns according to the present technique are used.

Processors(s) 1240 may be configured to execute the above described embodiments. The processor(s) can comprise one or more of DMRS generation circuitry 1242, transmit signal generation circuitry 1244 and resource element demapping circuitry 1246. Similarly, a transceiver module 1265 comprises DMRS generation circuitry 1266 transmit signal generation circuitry 1268 and resource element demapping circuitry 1269. It will be appreciated that the DMRS pattern selection, insertion functionality and/or the DMRS signal extraction and channel estimation functionality may be distributed or allocated in different ways across the system involving one or more of the processor(s) 1240, transceiver module 1265, system memory 1210 and NVM/Storage 1230.

System control logic 1220 for one embodiment may include any suitable interface controllers to provide for any suitable interface to at least one of the processor(s) 1240 and/or to any suitable device or component in communication with system control logic 1220.

System control logic 1220 for one embodiment may include one or more memory controller(s) to provide an interface to system memory 1210. System memory 1210 may be used to load and store data and/or instructions, for example, for system 1200. System memory 1210 for one embodiment may include any suitable volatile memory, such as suitable dynamic random access memory (DRAM), for example.

NVM/storage 1230 may include one or more tangible, non-transitory or transitory computer-readable media used to store data and/or instructions, for example. NVM/storage 1230 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1230 may include a storage resource physically part of a device on which the system 1200 is installed or it may be accessible by, but not necessarily a part of, the device. For example, the NVM/storage 1230 may be accessed over a network via the network interface 1260.

System memory 1210 and NVM/storage 1230 may respectively include, in particular, temporal and persistent copies of, for example, the instructions portions 1215 and 1235, respectively. D2D modules 1215 and 1235 may include instructions that when executed by at least one of the processor(s) 1240 result in the system 1200 implementing one or more of methods of any embodiment, as described herein. In some embodiments, instructions 1215 and 1235, or hardware, firmware, and/or software components thereof, may additionally/alternatively be located in the system control logic 1220, the network interface 1260, and/or the processor(s) 1240.

The transceiver module 1265 provides a radio interface for system 1200 to communicate over one or more network(s) (e.g. wireless communication network) and/or with any other suitable device. The transceiver 1265 may perform the various communicating, transmitting and receiving described in the various embodiments, and may include a transmitter section and a receiver section. In various embodiments, the transceiver 1265 may be integrated with other components of system 1200. For example, the transceiver 1265 may include a processor of the processor(s) 1240, memory of the system memory 1210, and NVM/Storage of NVM/Storage 1230. Network interface 1260 may include any suitable hardware and/or firmware. Network interface 1260 may be operatively coupled to a plurality of antennas to provide a multiple input, multiple output radio interface. Network interface 1260 for one embodiment may include, for example, a network adapter, a wireless network adapter, a telephone modem, and/or a wireless modem. For example, where system 1200 is an eNodeB, network interface 1260 may include an Ethernet interface, an S1-Mobility Management Entity (MME) interface and/or an S1-U interface. The system 1200 of FIG. 12 may be implemented in a UE, but may alternatively be implemented in a vehicle, picocell, femtocell or relay node for the purposes of implementing peer-to-peer communication and modulation and/or demodulation of a signal by selecting and inserting an appropriate pattern of DMRS signals to enable compensation for frequency selective fading as a result of, for example Doppler shift and Doppler spread to be compensated for. Appropriately selected DMRS patterns allow efficient channel estimation and yet balance the benefits of increased density of DMRS resource elements against the overhead incurred by including too many DMRS resource elements at the expense of SL channel data for PSXCH.

For one embodiment, at least one of the processor(s) 1240 may be packaged together with logic for one or more controller(s) of system control logic 1220. For one embodiment, at least one of the processor(s) 1240 may be packaged together with logic for one or more controllers of system control logic 1220 to form a System in Package (SiP). For one embodiment, at least one of the processor(s) 1240 may be integrated on the same die with logic for one or more controller(s) of system control logic 1220. For one embodiment, at least one of the processor(s) 1240 may be integrated on the same die with logic for one or more controller(s) of system control logic 1220 to form a System on Chip (SoC). Each of the processors 1240 may include an input for receiving data and an output for outputting data.

In various embodiments, the I/O devices 1250 may include user interfaces designed to enable user interaction with the system 1200, peripheral component interfaces designed to enable peripheral component interaction with the system 1200, and/or sensors designed to determine environmental conditions and/or location information related to the system 1200.

Figure 13:
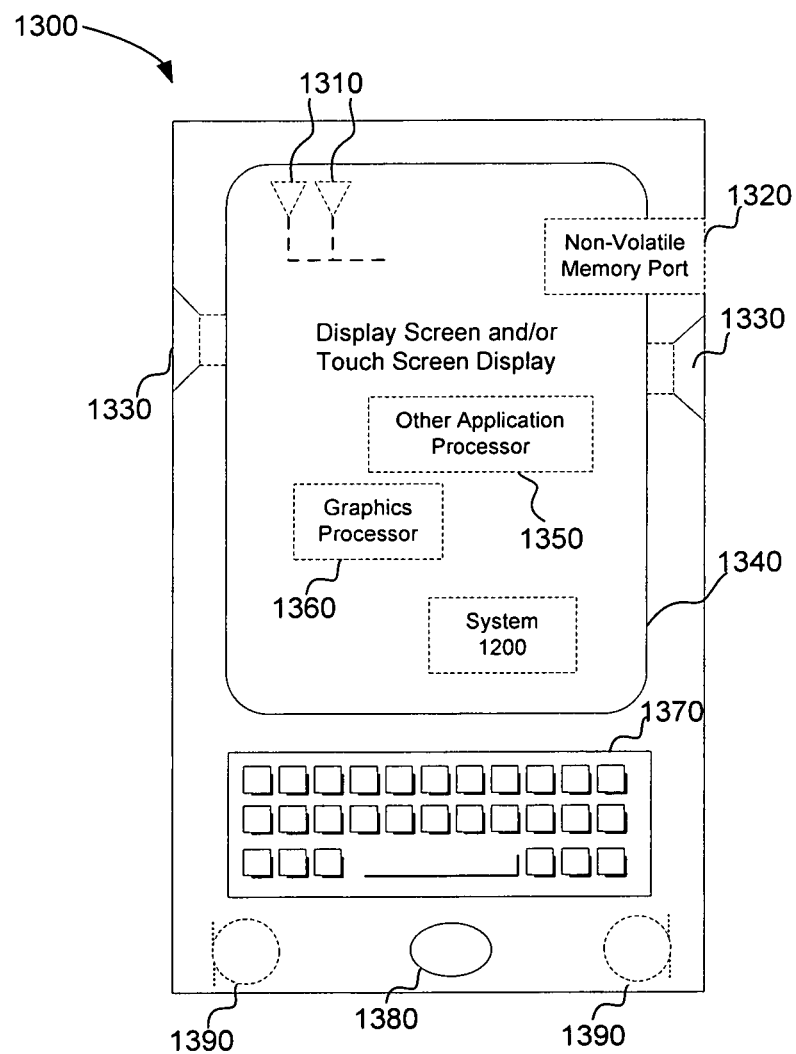
FIG. 13 shows an embodiment in which the system of FIG. 12 implements a wireless device.

FIG. 13 shows an embodiment in which the system 1200 implements a wireless device 1300, such as user equipment (UE), a mobile station (MS), a mobile wireless device, a mobile communication device, a tablet, a handset, or other type of wireless device. The wireless device can include one or more antennas 1310 configured to communicate with a node, macro node, low power node (LPN), or, transmission station, such as a base station (BS), an evolved Node B (eNodeB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The device is capable of performing D2D communication with other proximal wireless devices both when in-coverage and out-of-coverage with respect to the wireless cellular network. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

The wireless device 1300 of FIG. 13 also provides an illustration of a microphone 1390 and one or more speakers 1330 that can be used for audio input and output from the wireless device. In various embodiments, the user interfaces could include, but are not limited to, a display 1340 (e.g., a liquid crystal display, a touch screen display, etc.), a speaker 1330, a microphone 1390, one or more cameras 1380 (e.g., a still camera and/or a video camera), a flashlight (e.g., a light emitting diode flash), and a keyboard 1370.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 1360 to communicate with components of a positioning network, e.g., a global positioning system (GPS) satellite.

In various embodiments, the system 1300 may be a mobile computing device such as, but not limited to, a laptop computing device, a tablet computing device, a netbook, a mobile phone, etc. In various embodiments, system 1300 may have more or less components, and/or different architectures.

In embodiments, the implemented wireless network may be a 3rd Generation Partnership Project's long term evolution (LTE) advanced wireless communication standard, which may include, but is not limited to releases 8, 9, 10, 11, 12, and 13 or later, of the 3GPP's LTE-A standards.

Various techniques, or certain aspects or portions thereof, may take the form of program code (i.e., instructions) embodied in tangible media, such as floppy diskettes, CD-ROMs, hard drives, transitory or non-transitory computer readable storage medium, or any other machine-readable storage medium such that when the program code is loaded into and executed by a machine, such as a computer, the machine becomes an apparatus for practicing the various techniques according to the above described embodiments. In the case of program code execution on programmable devices such as a UE or a wireless device, the computing device may include a processor, digital signal processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data.

One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that the functional units described in this specification have been labeled as units or modules or circuitry or logic, to highlight their implementation independence. Note that a module/unit/circuitry may be implemented, for example, as a hardware circuit comprising custom VLSI circuits or gate arrays, off-the-shelf semiconductors such as logic chips, transistors, or other discrete components. A module/unit/circuitry/logic may also be implemented in programmable hardware devices such as field programmable gate arrays, programmable array logic, programmable logic devices or the like. The module/unit/circuitry/logic may be general purpose processor circuitry configured by program code to perform specified processing functions, for example firmware. The module/units/circuitry/logic may also be configured by modification to the processing hardware. Configuration of the circuitry to perform a specified function may be entirely in hardware, entirely in software or using a combination of hardware modification and software execution. Program instructions may be used to configure logic gates of general purpose or special-purpose processor circuitry to perform a processing function. The modules/units/circuitry may be implemented in logic such as hardware logic elements, combinations of logic elements or other circuit components.

Modules/units/circuitry/logic may also be implemented in software for execution by various types of processors. An identified module or set of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which; when joined logically together, comprise the module and achieve the stated purpose for the module.

Indeed, a module or set of executable code may be a single instruction, or many instructions, and may even be distributed over several different code segments, among different programs, and across several memory devices. Similarly, operational data may be identified and illustrated herein within modules, units or circuitry, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Figure 14:
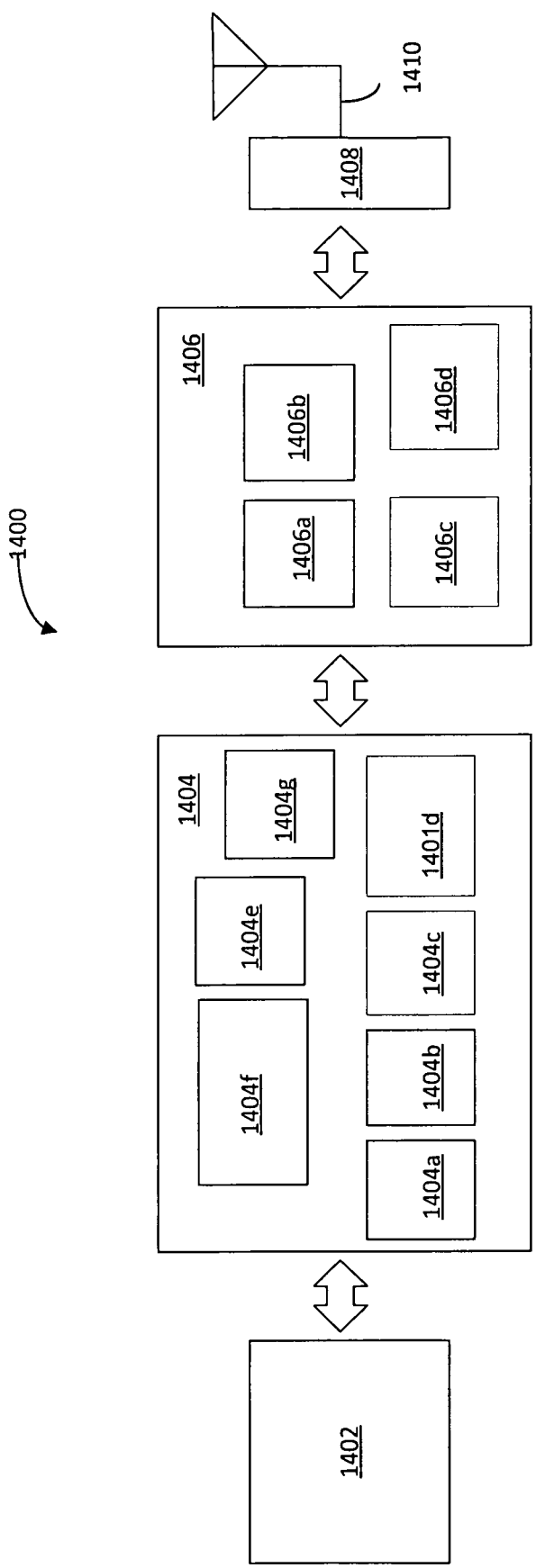
FIG. 14 schematically illustrates, for one embodiment, example components of an electronic device.

Embodiments described herein may be implemented into a system using any suitably configured hardware and/or software. FIG. 14 illustrates, for one embodiment, example components of an electronic device 1400. In embodiments, the electronic device 1400 may be a user equipment (UE), an evolved NodeB (eNodeB), and the like. In some embodiments, the electronic device 1400 may include application circuitry 1402, baseband circuitry 1404, Radio Frequency (RF) circuitry 1406, front-end module (FEM) circuitry 1408 and one or more antennas 110, coupled together at least as shown.

The application circuitry 1402 may include one or more application processors. For example, the application circuitry 1402 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be to execute instructions stored in the memory/storage to enable various applications and/or operating systems to run on the system.

The baseband circuitry 1404 may include circuitry such as, but not limited to, one or more single-core or multi-core processors. The baseband circuitry 1404 may include one or more baseband processors and/or control logic to process baseband signals received from a receive signal path of the RF circuitry 1406 and to generate baseband signals for a transmit signal path of the RF circuitry 1406. Baseband processing circuitry 1404 may interface with the application circuitry 1402 for generation and processing of the baseband signals and for controlling operations of the RF circuitry 1406. For example, in some embodiments, the baseband circuitry 1404 may include a second generation (2G) baseband processor 1404a, third generation (3G) baseband processor 1404b, fourth generation (4G) baseband processor 1404c, and/or other baseband processor(s) 1404d for other existing generations, generations in development or to be developed in the future (e.g., fifth generation (5G), 6G, etc.). The baseband circuitry 1404 (e.g., one or more of baseband processors 1404a-d) may handle various radio control functions that enable communication with one or more radio networks via the RF circuitry 1406. The radio control functions may include, but are not limited to, signal modulation/demodulation, encoding/decoding, radio frequency shifting, etc. In some embodiments, modulation/demodulation circuitry of the baseband circuitry 1404 may include Fast-Fourier Transform (FFT), precoding, and/or constellation mapping/demapping functionality. In some embodiments, encoding/decoding circuitry of the baseband circuitry 1404 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1404 may include elements of a protocol stack such as, for example, elements of an evolved universal terrestrial radio access network (RERAN) protocol including, for example, physical (PHY), media access control (MAC), radio link control (RLC), packet data convergence protocol (PDCP), and/or radio resource control (RRC) elements. A central processing unit (CPU) 1404e of the baseband circuitry 1404 may be configured to run elements of the protocol stack for signaling of the PHY, MAC, RLC, PDCP and/or RRC layers. In some embodiments, the baseband circuitry may include one or more audio digital signal processor(s) (DSP) 1404f. The audio DSP(s) 1404f may be include elements for compression/decompression and echo cancellation and may include other suitable processing elements in other embodiments.

The baseband circuitry 1404 may further include memory/storage 1404g. The memory/storage 1404g may be used to load and store data and/or instructions for operations performed by the processors of the baseband circuitry 1404. Memory/storage for one embodiment may include any combination of suitable volatile memory and/or non-volatile memory. The memory/storage 1404g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 1404g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 1404 and the application circuitry 1402 may be implemented together such as, for example, on a system on a chip (SOC).

In some embodiments, the baseband circuitry 104 may provide for communication compatible with one or more radio technologies. For example, in some embodiments, the baseband circuitry 1404 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1404 is to support radio communications of more than one wireless protocol may be referred to as multi-mode baseband circuitry.

RF circuitry 1406 may enable communication with wireless networks using modulated electromagnetic radiation through a non-solid medium. In various embodiments, the RF circuitry 1406 may include switches, filters, amplifiers, etc. to facilitate the communication with the wireless network. RF circuitry 1406 may include a receive signal path which may include circuitry to down-convert RF signals received from the FEM circuitry 108 and provide baseband signals to the baseband circuitry 1404. RF circuitry 1406 may also include a transmit signal path which may include circuitry to up-convert baseband signals provided by the baseband circuitry 1404 and provide RF output signals to the FEM circuitry 1408 for transmission.

In some embodiments, the RF circuitry 1406 may include a receive signal path and a transmit signal path. The receive signal path of the RF circuitry 106 may include mixer circuitry 1406a, amplifier circuitry 1406b and filter circuitry 1406c. The transmit signal path of the RF circuitry 106 may include filter circuitry 106c and mixer circuitry 1406a. RF circuitry 1406 may also include synthesizer circuitry 1406d for synthesizing a frequency for use by the mixer circuitry 1406a of the receive signal path and the transmit signal path. In some embodiments, the mixer circuitry 1406a of the receive signal path may be to down-convert RF signals received from the FEM circuitry 1408 based on the synthesized frequency provided by synthesizer circuitry 1406d. The amplifier circuitry 1406b may be to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 1406a of the transmit signal path may be to up-convert input baseband signals based on the synthesized frequency provided by the synthesizer circuitry 1406d to generate RF output signals for the FEM circuitry 1408. The baseband signals may be provided by the baseband circuitry 1404 and may be filtered by filter circuitry 1406c. The filter circuitry 1406c may include a low-pass filter (LPF), although the scope of the embodiments is not limited in this respect.

In some embodiments, the mixer circuitry 1406a of the receive signal path and the mixer circuitry 1406a of the transmit signal path may include two or more mixers and may be arranged for quadrature down-conversion and/or up-conversion respectively. In some embodiments, the mixer circuitry 1406a of the receive signal path and the mixer circuitry 106a of the transmit signal path may include two or more mixers and may be arranged for image rejection (e.g., Hartley image rejection). In some embodiments, the mixer circuitry 1406a of the receive signal path and the mixer circuitry 106a may be arranged for direct down-conversion and/or direct up-conversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 146 may include analog-to-digital converter (ADC) and digital-to-analog converter (DAC) circuitry and the baseband circuitry 1404 may include a digital baseband interface to communicate with the RF circuitry 1406.

In some dual-mode embodiments, a separate radio IC circuitry may be provided for processing signals for each spectrum, although the scope of the embodiments is not limited in this respect.

In some embodiments, the synthesizer circuitry 1406d may be a fractional-N synthesizer or a fractional N/N+1 synthesizer, although the scope of the embodiments is not limited in this respect as other types of frequency synthesizers may be suitable. For example, synthesizer circuitry 1406d may be a delta-sigma synthesizer, a frequency multiplier, or a synthesizer comprising a phase-locked loop with a frequency divider.

The synthesizer circuitry 1406d may be to synthesize an output frequency for use by the mixer circuitry 1406a of the RF circuitry 1406 based on a frequency input and a divider control input. In some embodiments, the synthesizer circuitry 1406d may be a fractional N/N+1 synthesizer.

In some embodiments, frequency input may be provided by a voltage controlled oscillator (VCO), although that is not a requirement. Divider control input may be provided by either the baseband circuitry 1404 or the applications processor 1402 depending on the desired output frequency. In some embodiments, a divider control input (e.g., N) may be determined from a look-up table based on a channel indicated by the applications processor 1402.

Synthesizer circuitry 1406d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1406d may be to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1406 may include an IQ/polar converter.

FEM circuitry 1408 may include a receive signal path which may include circuitry to operate on RF signals received from one or more antennas 1410, amplify the received signals and provide the amplified versions of the received signals to the RF circuitry 1406 for further processing. FEM circuitry 1408 may also include a transmit signal path which may include circuitry to amplify signals for transmission provided by the RF circuitry 1406 for transmission by one or more of the one or more antennas 1410.

In some embodiments, the FEM circuitry 1408 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1406). The transmit signal path of the FEM circuitry 1408 may include a power amplifier (PA) to amplify input RF signals (e.g., provided by RF circuitry 1406), and one or more filters to generate RF signals for subsequent transmission (e.g., by one or more of the one or more antennas 1410).

In some embodiments, the electronic device 1400 may include additional elements such as, for example, memory/storage, display, camera, sensor, and/or input/output (I/O) interface.

In embodiments, the electronic device 1400 may be configured to perform one or more processes, techniques, and/or methods as described herein or in portions thereof.

EXAMPLES

Example 1 may include a method of the LTE Sidelink demodulation reference signal, DMRS, transmission based on the dense placement of DMRS signals when DMRS transmissions take place in multiple symbols in each time slot.

Example 2 may include the method of example 1 or some other example herein, wherein the DMRS has frequency contiguous transmission pattern and occupies all resource elements, REs, in a physical resource block, PRB, pair in the allocated symbol.

Example 3 may include the method of example 2 or some other example herein, wherein for the Normal cyclic prefix, CP, case the DMRS is transmitted in symbols 3, 7, 10 in the subframe (i.e. symbol 3 in the 1st slot and symbols 0, 3 in the 2nd slot).

Example 4 may include the method of example 2 or some other example herein, wherein for the Normal CP case the DMRS is transmitted in symbols 3, 6, 10 in the subframe (i.e. symbols 3, 6 in the 1st slot and symbol 3 in the 2nd slot).

Example 5 may include the method of example 2 or some other example herein, wherein for the Normal CP case the DMRS is transmitted in symbols 2, 5, 8 and 11 in the subframe (i.e. symbols 2, 5 in the 1st slot and symbols 1, 4 in the 2nd slot).

Example 6 may include the method of example 2 or some other example herein, wherein for the Normal CP case the DMRS is transmitted in symbols 3, 5, 8 and 10 in the subframe (i.e. symbols 3, 5 in the 1st slot and symbols 1, 3 in the 2nd slot).

Example 7 may include the method of example 2 or some other example herein, wherein for the Normal CP case the DMRS is transmitted in symbols 4 and 9 in the subframe (i.e. symbol 4 in the 1st slot and symbol 2 in the 2nd slot).

Example 8 may include the method of example 2 or some other example herein, wherein for the Extended CP case the DMRS is transmitted in symbols 2, 5 and 8 in the subframe (i.e. symbols 2, 5 in the 1st slot and symbol 2 in the 2nd slot).

Example 9 may include the method of example 2 or some other example herein, wherein for the Extended CP case the DMRS is transmitted in symbols 3, 6 and 9 in the subframe (i.e. symbol 3 in the 1st slot and symbols 0 and 3 in the 2nd slot).

Example 10 may include the method of example 2 or some other example herein, wherein for the Extended CP case the DMRS is transmitted in symbols 1, 5 and 9 in the subframe (i.e. symbols 1, 5 in the 1st slot and symbol 3 in the 2nd slot).

Example 11 may include the method of example 2 or some other example herein, wherein for the Extended CP case the DMRS is transmitted in symbols 1, 4, 7 and 10 in the subframe (i.e. symbols 1, 4 in the 1st slot and symbols 1, 4 in the 2nd slot).

Example 12 may include the method of example 2 or some other example herein, wherein for the Extended CP case the DMRS is transmitted in symbols 2, 4, 7 and 9 in the subframe (i.e. symbols 2, 4 in the 1st slot and symbols 1, 3 in the 2nd slot).

Example 13 may include the method of example 2 or some other example herein, wherein for the Extended CP case the DMRS is transmitted in symbols 3 and 8 in the subframe (i.e. symbol 3 in the 1st slot and symbol 2 in the 2nd slot).

Example 14 may include the method of example 1 or some other example herein, wherein the DMRS frequency non-contiguous transmission pattern and transmission occupies 4 REs in a PRB in each allocated symbol with 3 REs offset between the REs in frequency.

Example 15 may include the method of example 14 or some other example herein, wherein the DMRS position in frequency is same for all allocated DMRS symbols.

Example 16 may include the method of example 14 or some other example herein, wherein the DMRS position in frequency is different for the allocated with 3 REs offset in the consecutive allocated symbols.

Example 17 may include the method of example 14 or some other example herein, wherein for the Normal CP case the DMRS is transmitted in symbols 1, 3, 5, 8, 10 and 12 in the subframe.

Example 18 may include the method of example 14 or some other example herein, wherein for the Normal CP case the DMRS is transmitted in symbols 2, 4, 6, 8, 10 and 12 in the subframe.

Example 19 may include the method of example 14 or some other example herein, wherein for the Normal CP case the DMRS is transmitted in symbols 1, 3, 5, 7, 9 and 11 in the subframe.

Example 20 may include the method of example 14 or some other example herein, wherein for the Extended CP case the DMRS is transmitted in symbols 1, 3, 5, 7 and 9 in the subframe.

Example 21 may include the method of example 14 or some other example herein, wherein for the Extended CP case the DMRS is transmitted in symbols 1, 3, 5, 6, 8 and 10 in the subframe Example 22 may include the method of example 14 or some other example herein, wherein for the Extended CP case the DMRS is transmitted in symbols 0, 2, 4, 6, 8 and 10 in the subframe.

Example 23 may include the method of example 1 or some other example herein, wherein LTE Sidelink transmissions have 1 slot resource allocation granularity Example 24 may include the method of example 23 or some other example herein, wherein for the Normal CP case the DMRS is transmitted in symbols 1 and 5 in the slot.

Example 25 may include the method of example 23 or some other example herein, wherein for the Normal CP case the DMRS is transmitted in symbols 2 and 4 in the slot.

Example 26 may include the method of example 23 or some other example herein, wherein for the Normal CP case the DMRS is transmitted in symbols 2 and 5 in the slot.

Example 27 may include the method of example 23 or some other example herein, wherein for the Normal CP case the DMRS is transmitted in symbols 1 and 4 in the slot.

Example 28 may include the method of example 23 or some other example herein, wherein for the Extended CP case the DMRS is transmitted in symbols 1 and 4 in the slot.

Example 29 may include the method of example 23 or some other example herein, wherein for the Extended CP case the DMRS is transmitted in symbols 2 and 4 in the slot.

Example 30 may include the method of example 23 or some other example herein, wherein for the Extended CP case the DMRS is transmitted in symbols 1 and 3 in the slot.

Example 31 may include the method of example 1 or some other example herein, wherein the transmitter uses a configured or pre-configured fixed DMRS pattern.

Example 32 may include the method of example 31 or some other example herein, wherein the information on the DMRS pattern is provided via RRC signalling.

Example 33 may include the method of example 1 or some other example herein, wherein adaptive DMRS pattern selection is used at the transmitter.

Example 34 may include the method of example 33 or some other example herein, wherein the transmitter may adaptively select the target DMRS pattern based some criteria (e.g. speed, relative speed, carrier frequency band, etc.) which may or may not involve knowledge of the receiver parameters.

Example 35 may include the method of example 31 or some other example herein, wherein the receiver has knowledge of a configured or pre-configured fixed DMRS pattern.

Example 36 may include the method of example 31 or example 33 or some other example herein, wherein the receiver performs detection of the DMRS pattern used at the transmitter via DMRS signal presence detection on different symbols.

Example 37 may include the method of example 1 or some other example herein, wherein the resource mapping and rate matching of the SL transmissions is done in a way so that symbols, which are distant from DMRS are either not used for transmission or non-systematic bits are transmitted within these bits with higher intensity.

Example 38 may include a method, technique, or process as described herein or related to any of examples 1-37, or portions or parts thereof.

Example 39 may include an apparatus comprising logic, modules, and/or circuitry to perform one or more elements of a method described in or related to any of examples 1-37, or any other method or process described herein.

Example 40 may include an apparatus comprising means to perform one or more elements of a method described in or related to any of examples 1-37, or any other method or process described herein.

Example 41 may include one or more non-transitory computer-readable media comprising instructions to cause an electronic device, upon execution of the instructions by one or more processors of the electronic device, to perform one or more elements of a method described in or related to any of examples 1-37, or any other method or process described herein.

Example 42 may include an apparatus comprising logic, modules, and/or circuitry to perform one or more elements of a method described in or related to any of examples 1-37, or any other method or process described herein.

Example 43 may include a method of communicating in a wireless network as shown and described herein.

Example 44 may include a system for providing wireless communication as shown and described herein.

Example 45 may include a device for providing wireless communication as shown and described herein.

Further example embodiments can be provided according to the following numbered clauses.

Clause 1. Transmission path circuitry, for use in a User Equipment (UE) of a Long Term Evolution (LTE) wireless communication network, the UE being configured to transmit and/or receive device-to-device communications, the transmission path circuitry comprising:

transmit signal generation circuitry for generating physical resource blocks of a signal for transmission, each physical resource block comprising a plurality of subcarriers in a frequency domain and a plurality of symbols corresponding to a slot in a time domain, wherein a resource element of the physical resource block corresponds to one symbol and one subcarrier;

demodulation reference signal (DMRS) generation circuitry for generating demodulation reference signals for selective insertion in resource elements of the resource blocks of the signal for transmission; and wherein the transmit signal generation circuitry is arranged to allocate a pattern of resource elements spanning at least one of the resource blocks to contain demodulation reference signals such that a minimum temporal spacing between consecutive symbols of the demodulation reference signal pattern is less than one slot.

Clause 2. Transmission path circuitry of clause 1, wherein the signal for transmission is one of: a Long Term Evolution (LTE) sidelink signal wherein the resource blocks of the transmission signal comprise a subset of resources of an LTE sidelink resource allocation; or an LTE uplink signal.

Clause 3. Transmission path circuitry of clause 1 or clause 2, wherein the transmit signal generation circuitry is arranged to allocate the demodulation reference signal pattern such that it comprises contiguous resource elements in the frequency domain corresponding to all subcarriers of a given symbol of the resource block.

Clause 4. Transmission path circuitry as in any one of clauses 1 to 3, wherein the pattern of resource elements spans a physical resource block pair of a subframe such that resource element positions of consecutive demodulation reference signals within the subframe have a temporal separation of less than one slot.

Clause 5. Transmission path circuitry of clause 1 or clause 2, wherein the transmit signal generation circuitry is arrange to allocate the demodulation reference signal pattern such that it comprises non-contiguous resource elements in the frequency domain corresponding to a subset of subcarriers of a given symbol of the resource block.

Clause 6. Transmission path circuitry as in any one of clauses 1 to 5, wherein the pattern of resource elements spans physical resource block pair of a subframe and comprises at least three different symbols of the subframe.

Clause 7. Transmission path circuitry as in any one of clauses 1 to 5, wherein the pattern of resource elements spans a pair of time-consecutive resource blocks of a subframe and comprises four different symbols of the subframe.

Clause 8. Transmission path circuitry as in any one of clauses 1 to 3, wherein the transmit signal generation circuitry is arranged to allocate the pattern of resource elements containing demodulation reference signals using one of a per-slot level allocation and a per sub-frame level allocation.

Clause 9. Transmission path circuitry as in any one of the preceding clauses, wherein the transmit signal generation circuitry is arranged to preferentially allocate non-systematic bits of information of the transmitted signal to resource elements of the physical resource block more distant from resource elements of the pattern of resource elements containing demodulation reference signals.

Clause 10. Transmission path circuitry as in any one of the preceding clauses, wherein the transmit signal generation circuitry comprises pattern selection circuitry arranged to select the pattern of resource elements containing demodulation reference signals depending upon at least one pattern selection criterion and the pattern selection criteria comprise at least one of: a transmitter speed; a relative speed of a transmitter and a target receiver; or a frequency band Clause 11. Transmission path circuitry of clause 10, wherein the pattern selection criterion is the frequency band of a carrier frequency and wherein a more dense pattern of resource elements is selected for a higher carrier frequency.

Clause 12. Transmission path circuitry as in any one of clauses 1 to 11, wherein the physical resource block comprises twelve subcarriers by seven symbols corresponding to a normal cyclic prefix length and wherein the pattern of demodulation reference signals spans a sub-frame of two contiguous slots indexed from symbol 0 to symbol 13 and wherein all twelve subcarriers of symbol 4 and symbol 9 are allocated to demodulation reference signals.

Clause 13. Transmission path circuitry as in any one of clauses 1 to 11, wherein the physical resource block comprises twelve subcarriers by seven symbols corresponding to a normal cyclic prefix length and wherein the pattern of demodulation reference signals spans a sub-frame of two contiguous slots indexed from symbol 0 to symbol 13 and wherein all twelve subcarriers of symbol 2, symbol 5 and symbol 8 and symbol 11 are allocated to demodulation reference signals.

Clause 14. Transmission path circuitry as in any one of clauses 1 to 11, wherein the physical resource block comprises twelve subcarriers by seven symbols corresponding to a normal cyclic prefix length and wherein the pattern of demodulation reference signals spans a sub-frame of two contiguous slots indexed from symbol 0 to symbol 13 and wherein resource elements for all twelve subcarriers of symbol 3, symbol 5 and symbol 8 and symbol 10 are allocated to demodulation reference signals.

Clause 15. Transmission path circuitry as in any one of clauses 1 to 11, wherein the physical resource block comprises twelve subcarriers by six symbols corresponding to an extended cyclic prefix length and wherein the pattern of demodulation reference signals spans a sub-frame of two contiguous slots indexed from symbol 0 to symbol 11 and wherein all twelve subcarriers of symbol 3 and symbol 8 are allocated to demodulation reference signals.

Clause 16. Transmission path circuitry as in any one of clauses 1 to 11, wherein the physical resource block comprises twelve subcarriers by six symbols corresponding to an extended cyclic prefix length and wherein the pattern of demodulation reference signals spans a sub-frame of two contiguous slots indexed from symbol 0 to symbol 11 and wherein all twelve subcarriers of symbol 1, symbol 3 and symbol 7 and symbol 10 are allocated to demodulation reference signals.

Clause 17. Transmission path circuitry as in any one of clauses 1 to 11, wherein the physical resource block comprises twelve subcarriers by six symbols corresponding to an extended cyclic prefix length and wherein the pattern of demodulation reference signals spans a sub-frame of two contiguous slots indexed from symbol 0 to symbol 11 and wherein all twelve subcarriers of symbol 2, symbol 4 and symbol 7 and symbol 9 are allocated to demodulation reference signals.

Clause 18. Transmission path circuitry as in any one of clauses 1 to 11, wherein the physical resource block comprises twelve subcarriers by seven symbols corresponding to a normal cyclic prefix length and wherein the pattern of demodulation reference signals spans a single slot indexed from symbol 0 to symbol 6 and wherein all twelve subcarriers of one of the following pairs of symbols are allocated to demodulation reference signals: symbols 1 and 5; symbols 2 and 4; symbols 2 and 5; and symbols 1 and 4.

Clause 19. Transmission path circuitry as in any one of clauses 1 to 11, wherein the physical resource block comprises twelve subcarriers by six symbols corresponding to an extended cyclic prefix length and wherein the pattern of demodulation reference signals spans a single slot indexed from symbol 0 to symbol 5 and wherein all twelve subcarriers of one of the following pairs of symbols are allocated to demodulation reference signals: symbols 1 and 4; symbols 2 and 4; and symbols 1 and 3.

Clause 20. Transmission path circuitry of clause 1 or clause 2, wherein the transmit signal generation circuitry is arranged to allocate the demodulation reference signal pattern such that it comprises a plurality of candidate DMRS pattern positions, wherein one of the plurality of DMRS pattern positions is selectable for a given transmission and comprises non-contiguous resource elements in the frequency domain.

Clause 21. Transmission path circuitry of clause 20, wherein the plurality of candidate DMRS pattern positions together occupy contiguous frequencies corresponding to all subcarriers of a given symbol of the physical resource block when the given symbol is allocated to the demodulation reference signal pattern.

Clause 22. Transmission path circuitry of clause 21, wherein resource elements of a given one of the plurality of candidate DMRS pattern positions and to a given transmission occupy all available DMRS resource elements of a given subcarrier frequency allocated to the demodulation reference signal pattern.

Clause 23. Transmission path circuitry of clause 21 or clause 22, wherein available DMRS resource elements of a given subcarrier frequency spanning a subframe are allocated in a round-robin sequence to different ones of the plurality of candidate DMRS pattern positions corresponding to respective different transmissions.

Clause 24. Transmission path circuitry as in any one of clauses 21 to 23, wherein the physical resource block comprises twelve subcarriers by seven symbols corresponding to a normal cyclic prefix length and wherein the pattern of demodulation reference signals spans a sub-frame of two contiguous slots indexed from symbol 0 to symbol 13 and wherein a set of symbols allocated to the demodulation reference signal pattern comprises one of: symbols 1, 3, 5, 8, 10 and 12; symbols 2, 4, 6, 8, 10 and 12; and symbols 1, 3, 5, 7, 9 and 11.

Clause 25. Transmission path circuitry as in in any one of clauses 21 to 23, wherein the physical resource block comprises twelve subcarriers by six symbols corresponding to an extended cyclic prefix length and wherein the pattern of demodulation reference signals spans a sub-frame of two contiguous slots indexed from symbol 0 to symbol 11 and wherein a set of symbols allocated to the demodulation reference signal pattern comprises symbols one of: symbols 1, 3, 5, 6, 8 and 10; symbols 1, 3, 5, 7 and 9; and symbols 0, 2, 4, 6, 8 and 10.

Clause 26. Receive path circuitry, for use in a device of a wireless communication network, the device being configured to transmit and receive Long Term Evolution (LTE) communications, the receive path circuitry comprising:

receive path processing hardware having:

resource element demapping circuitry for receiving resource blocks of a signal from a User Equipment, each physical resource block comprising a plurality of subcarriers in a frequency domain and a plurality of symbols corresponding to a slot in a time domain, wherein a resource element of the physical resource block corresponds to one symbol and one subcarrier and wherein the resource blocks contain a structure of demodulation reference signals in which a two or more demodulation reference signals are allocated within one slot; and channel estimation circuitry for estimating a characteristic of a communication channel of the received signal using the structure of demodulation reference signals for use in reproducing a transmitted signal based upon the resource blocks of the received signal.

Clause 27. Receive path circuitry of clause 26, wherein the received signal is a Long Term Evolution Sidelink signal, and wherein the resource blocks of the received signal comprise a subset of resources of a Long Term Evolution (LTE) sidelink resource allocation Clause 28. Receive path circuitry of clause 25, wherein the resource element demapping circuitry is arranged to detect which pattern of demodulation reference signals has been applied at the transmitter and to indicate to a demodulator how to adapt demodulation based upon the detected structure.

Clause 29. A computer program product embodied on a computer-readable medium comprising program instructions configured such that when executed by processing circuitry cause the processing circuitry to:

tranceive a Long Term Evolution (LTE) communication signal from a User Equipment comprising physical resource blocks in which demodulation reference signals are incorporated such that two or more resource elements in single a slot of a physical resource block corresponding to the LTE communication signal are dedicated to the demodulation reference signals.

Clause 30. The computer program product of clause 28, wherein the device-to-device communication signal is a LTE Sidelink signal.

Clause 31. A user equipment comprising the transmission path circuitry of any one of clauses 1 to 27 or the receive path circuitry of any one of clauses 25 to 27.

Clause 32. Transmission path circuitry, for use in a Use Equipment of a wireless communication network, the device being configured to transmit and receive device-to-device communications, the transmission path circuitry comprising:

means for generating a signal for transmission, each resource block comprising a plurality of subcarriers in a frequency domain and a plurality of symbols corresponding to a slot in a time domain, wherein a resource element of the resource block corresponds to one symbol and one subcarrier;

means for generating demodulation reference signals for selective insertion in resource elements of the resource blocks of the signal for transmission; and wherein the means for generating a signal for transmission is arranged to allocate a pattern of resource elements spanning at least one of the resource blocks to contain demodulation reference signals such that a minimum temporal spacing between consecutive symbols of the demodulation reference signal pattern is less than one slot.

Clause 33. Receive path circuitry, for use in a device of a wireless communication network, the device being configured to transmit and receive Long Term Evolution (LTE) communications, the receive path circuitry comprising:

means for receiving and demapping resource blocks of a signal, each resource block comprising a plurality of subcarriers in a frequency domain and a plurality of symbols corresponding to a slot in a time domain, wherein a resource element of the resource block corresponds to one symbol and one subcarrier and wherein the resource blocks contain a structure of demodulation reference signals in which two or more demodulation reference signals are allocated within one slot; and means for channel estimation for estimating a characteristic of a communication channel of the received signal using the structure of demodulation reference signals for use in reproducing a transmitted signal based upon the resource blocks of the received signal.

Clause 34. A User Equipment (UE) for use in a wireless communication network, the UE comprising:

a touchscreen configured to receive input from a user for processing by the UE;

transmit signal generation circuitry for generating resource blocks of a signal for transmission, each resource block comprising a plurality of subcarriers in a frequency domain and a plurality of symbols corresponding to a slot in a time domain, wherein a resource element of the resource block corresponds to one symbol and one subcarrier;

demodulation reference signal generation circuitry for generating demodulation reference signals for insertion in resource elements of the resource blocks of the signal for transmission according to a demodulation reference signal pattern; and radio frequency circuitry arranged to up-convert in frequency baseband signals provided by the transmit signal generation circuitry and to provide radio frequency output signals for transmission;

wherein the transmit signal generation circuitry is arranged to allocate the pattern of resource elements spanning at least one of the resource blocks to contain demodulation reference signals such that a minimum temporal spacing between consecutive symbols of the demodulation reference signal pattern is less than one slot.

Clause 35. A User Equipment (UE) for use in a wireless communication network, the UE comprising:

a touchscreen configured to receive input from a user for processing by the UE;

radio frequency circuitry arranged to down-convert in frequency RF signals received from one or more antennas to generate a baseband signal for processing;

resource element demapping circuitry for receiving resource blocks of a signal via the baseband signal, each resource block comprising a plurality of subcarriers in a frequency domain and a plurality of symbols corresponding to a slot in a time domain, wherein a resource element of the resource block corresponds to one symbol and one subcarrier and wherein the resource blocks contain a structure of demodulation reference signals in which a two or more demodulation reference signals are allocated within one slot;

channel estimation circuitry for estimating a characteristic of a communication channel of the received signal using the structure of demodulation reference signals for use in reproducing a transmitted signal based upon the resource blocks of the received signal.

The foregoing description of one or more implementations provides illustration and description, but is not intended to be exhaustive or to limit the scope of the disclosure to the precise form disclosed. Modifications and variations are possible in light of the above teachings or may be acquired from practice of various implementations of the disclosure.

Clause 36. A method of modulating and transmitting a Long Term Evolution communication signal, the method comprising:

generating physical resource blocks of a signal for transmission, each physical resource block comprising a plurality of subcarriers in a frequency domain and a plurality of symbols corresponding to a slot in a time domain, wherein a resource element of the physical resource block corresponds to one symbol and one subcarrier;

generating demodulation reference signals for selective insertion in resource elements of the resource blocks of the signal for transmission; and allocating a pattern of resource elements spanning at least one of the resource blocks to contain demodulation reference signals such that a minimum temporal spacing between consecutive symbols of the demodulation reference signal pattern is less than one slot.

Clause 37. A method of receiving and demodulating a Long Term Evolution communication signal, the method comprising:

receiving and demapping resource blocks of a signal, each resource block comprising a plurality of subcarriers in a frequency domain and a plurality of symbols corresponding to a slot in a time domain, wherein a resource element of the resource block corresponds to one symbol and one subcarrier and wherein the resource blocks contain a structure of demodulation reference signals in which two or more demodulation reference signals are allocated within one slot; and estimating a characteristic of a communication channel of the received signal using the structure of demodulation reference signals for use in reproducing a transmitted signal based upon the resource blocks of the received signal.

The invention claimed is:

1. A User Equipment (UE) of a wireless communication network, the UE comprising:
   a transmitter configured to:
     generate physical resource blocks of a sidelink signal for transmission, each physical resource block comprising twelve subcarriers in a frequency domain and seven single-carrier frequency division multiple access (SC-FDMA) symbols in a time domain corresponding to a slot for a normal cyclic prefix length, wherein a respective resource element of each physical resource block corresponds to one symbol and one subcarrier; and
     generate demodulation reference signals (DMRS) for insertion in the resource elements of the physical resource blocks of the sidelink signal for transmission,
       wherein a pattern of the demodulation reference signals spans a sub-frame of two contiguous slots comprising SC-FDMA symbols each indexed from 0 to 6, a last SC-FDMA symbol of the sub-frame being a guard symbol, and wherein all twelve subcarriers of each of at least two SC-FDMA symbols of the sub-frame in the time domain is allocated to demodulation reference signals such that a number of symbols between adjacent demodulation reference signals in the time domain of the sub-frame is at least one and less than five SC-FDMA symbols.

2. The UE of claim 1, wherein the sidelink signal for transmission is one of a Physical Sidelink Shared Channel (PSSCH) Physical Sidelink Control Channel (PSCCH) and Physical Sidelink Broadcast Channel (PSBCH) transmission, and wherein SC-FDMA symbol corresponding to the guard symbol is not used for sidelink transmission.

3. The UE of claim 1, wherein at least all twelve subcarriers of symbol 4 in a first one of the two contiguous slots and all twelve subcarriers of symbol 2 in a second one of the two contiguous slots of the sub-frame are allocated to demodulation reference signals.

4. The UE of claim 3, wherein the sidelink signal for transmission is a Physical Sidelink Broadcast Channel (PSBCH) signal.

5. The UE of claim 1, wherein the pattern of the demodulation reference signals comprises all twelve subcarriers of symbol 2, symbol 5 in a first one of the two contiguous slots and all twelve subcarriers of symbol 1 and symbol 4 in a second one of the two contiguous slots.

6. The UE of claim 5, wherein the sidelink signal for transmission is a Physical Sidelink Shared Channel (PSSCH) signal of a Vehicle to Vehicle (V2V) communication.

7. The UE of claim 5, wherein the physical resource blocks of the PSSCH signal comprise a subset of resources of a sidelink resource allocation, the subset being signalled in Sidelink Control Information via a Physical Sidelink Control Channel (PSCCH).

8. The UE of claim 5, wherein the sidelink signal for transmission is a Physical Sidelink Control Channel (PSCCH) signal of a V2V communication.

9. The UE of claim 5, wherein the sidelink signal for transmission is a Vehicle to Vehicle (V2V) signal.

10. A User Equipment (UE) of a wireless communication network, the UE comprising:
    a receiver configured to:
      demap received resource blocks of a signal, each physical resource block comprising twelve subcarriers in a frequency domain and seven single-carrier frequency division multiple access (SC-FDMA) symbols corresponding to a slot in a time domain for a normal cyclic prefix length, wherein a resource element of the physical resource block corresponds to one SC-FDMA symbol and one subcarrier and a structure of demodulation reference signals repeats for each sub-frame of two contiguous seven SC-FDMA symbol slots each indexed from 0 to 6, and wherein a separation of adjacent demodulation reference signals in the time domain of the sub-frame comprises at least one SC-FDMA symbol not containing demodulation reference signals and at most four SC-FDMA symbols not containing demodulation reference signals; and
    estimate a characteristic of a communication channel of the received signal using the structure of demodulation reference signals, wherein the characteristic is used for reproducing a transmitted signal based upon the resource blocks of the received signal.

11. The UE of claim 10, wherein the structure of demodulation reference signals spans a sub-frame of two contiguous slots each indexed from SC-FDMA symbol 0 to SC-FDMA symbol 6, and wherein one of:
- all twelve subcarriers of symbol 2, symbol 5 in a first one of the two contiguous slots and all twelve subcarriers of symbol 1 and symbol 4 in a second one of the two contiguous slots are allocated to demodulation reference signals; or
- at least all twelve subcarriers of symbol 4 in a first one of the two contiguous slots and all twelve subcarriers of symbol 2 in a second one of the two contiguous slots are allocated to demodulation reference signals.

12. A non-transitory computer-readable medium storing one or more instructions executable by a computer system to perform operations comprising:
- generating a wireless communication signal for transmission, the signal comprising physical resource blocks each having twelve subcarriers by seven single-carrier frequency division multiple access (SC-FDMA) symbols corresponding to a normal cyclic prefix length,
  - wherein the pattern of demodulation reference signals spans a sub-frame of two contiguous slots each having seven SC-FDMA symbols to provide fourteen SC-FDMA symbols per sub-frame on a time axis, and wherein all twelve subcarriers of each of at least two the fourteen SC-FDMA symbols of the sub-frame are allocated to demodulation reference signals, adjacent ones of the at least two symbols being separated by at least one but less than or equal to four symbols of physical sidelink channel data (PSXCH).

13. The non-transitory computer-readable medium of claim 12, wherein the wireless communication signal is one of a Physical Sidelink Shared Channel (PSSCH) Physical Sidelink Control Channel (PSCCH) and Physical Sidelink Broadcast Channel (PSBCH) transmission.

14. The non-transitory computer-readable medium of claim 13, wherein the wireless communication signal is one of a PSSCH or a PSCCH, and wherein four of the fourteen SC-FDMA symbols of the sub-frame are allocated to demodulation reference signals, the four SC-FDMA symbols comprising symbol 2, symbol 5 in a first one of the two contiguous slots and symbol 1 and symbol 4 in a second one of the two contiguous slots wherein the SC-FDMA symbols of each slot are identified by indexing from symbol 0 to symbol 6.

15. The non-transitory computer-readable medium of claim 13, wherein the wireless communication signal is a PSBCH, and wherein at the at least two of the fourteen SC-FDMA symbols of the sub-frame allocated to demodulation reference signals comprise symbol 4 one of the seven symbols along the time axis of the first contiguous slot of the sub-frame and symbol 2 of the seven symbols along the time axis of the second contiguous slot of the sub-frame.

16. A User Equipment (UE) for use in a wireless communication network, the UE comprising:
- a touchscreen configured to receive input from a user for processing by the UE;
- a transmitter for generating resource blocks of a signal for transmission, each resource block comprising a plurality of subcarriers in a frequency domain and a plurality of single-carrier frequency division multiple access, SC-FDMA, symbols corresponding to a slot in a time domain, wherein a resource element of the resource block corresponds to one SC-FDMA symbol and one subcarrier;
- a demodulation reference signal generator for generating demodulation reference signals for insertion in resource elements of the resource blocks of the signal for transmission according to a demodulation reference signal pattern; and
- a radio frequency device arranged to up-convert, in frequency, baseband signals provided by the transmit signal generation circuitry and to provide radio frequency output signals for transmission,
- wherein the transmitter is arranged to allocate the pattern of resource elements spanning at least one of the resource blocks to contain demodulation reference signals such that a minimum temporal spacing between consecutive SC-FDMA symbols of the demodulation reference signal pattern is less than one slot, wherein the physical resource block comprises twelve subcarriers by seven SC-FDMA symbols corresponding to a normal cyclic prefix length, wherein the pattern of demodulation reference signals spans a sub-frame of two contiguous slots, and wherein all twelve subcarriers of at least two different symbols of the subframe separated on a time axis by less than or equal to four other SC-FDMA symbols and more than one other SC-FDMA symbol of the sub-frame are allocated to demodulation reference signals.

* * * * *

UNITED STATES PATENT AND TRADEMARK OFFICE
CERTIFICATE OF CORRECTION

PATENT NO. : 10,756,869 B2
APPLICATION NO. : 15/744009
DATED : August 25, 2020
INVENTOR(S) : Alexey Khoryaev et al.

Page 1 of 1

It is certified that error appears in the above-identified patent and that said Letters Patent is hereby corrected as shown below:

In the Claims

Column 32, Line 8, in Claim 2, after "(PSSCH)" insert -- , --;

Column 33, Line 26, in Claim 12, delete "two" and insert -- two of --;

Column 33, Line 35, in Claim 13, after "(PSSCH)" insert -- , --;

Column 34, Line 3, in Claim 15, after "wherein" delete "at"; and

Column 34, Line 5, in Claim 15, delete "4 one" and insert -- 4 --.

Signed and Sealed this
Eighth Day of December, 2020

Andrei Iancu
*Director of the United States Patent and Trademark Office*